US008586194B2

(12) United States Patent
Mullner et al.

(10) Patent No.: US 8,586,194 B2
(45) Date of Patent: *Nov. 19, 2013

(54) POLYCRYSTALLINE FOAMS EXHIBITING GIANT MAGNETIC-FIELD-INDUCED DEFORMATION AND METHODS OF MAKING AND USING SAME

(75) Inventors: Peter Mullner, Boise, ID (US); Markus Chmielus, Boise, ID (US); Cassie Witherspoon, Boise, ID (US); David C. Dunand, Evanston, IL (US); Xuexi Zhang, Evanston, IL (US); Yuttanant Boonyongmaneerat, Bangkok (TH)

(73) Assignees: Boise State University, Boise, ID (US); Northwestern University, Evanston, IL (US)

( * ) Notice: Subject to any disclaimer, the term of this patent is extended or adjusted under 35 U.S.C. 154(b) by 572 days.

This patent is subject to a terminal disclaimer.

(21) Appl. No.: 12/840,203

(22) Filed: Jul. 20, 2010

(65) Prior Publication Data

US 2011/0064965 A1 Mar. 17, 2011

Related U.S. Application Data

(63) Continuation-in-part of application No. 12/203,112, filed on Sep. 2, 2008, now Pat. No. 7,964,290.

(60) Provisional application No. 61/227,044, filed on Jul. 20, 2009, provisional application No. 60/969,018, filed on Aug. 30, 2007.

(51) Int. Cl.
*B32B 5/18* (2006.01)

(52) U.S. Cl.
USPC ........... 428/613; 428/642; 428/655; 428/668; 428/678; 428/681

(58) Field of Classification Search
USPC ........................................................ 428/613
See application file for complete search history.

(56) References Cited

U.S. PATENT DOCUMENTS 3,288,942 A 11/1966 Otto Voegeli
3,577,108 A 5/1971 Bengtson et al.

(Continued)

FOREIGN PATENT DOCUMENTS

WO WO2008/049124 A2 4/2008
WO WO2008/061166 A3 5/2008
WO WO2009/029953 A2 3/2009

OTHER PUBLICATIONS

Mullner et al., Large cyclic magnetic-field-induced deformation in orthorhombic (14M) Ni-Mn-Ga martensite, Journal of Applied Physics, Feb. 1, 2004, pp. 1531-1536, vol. 95, No. 3, American Institute of Physics.

(Continued)

*Primary Examiner* — Gwendolyn Blackwell
*Assistant Examiner* — Lucas Wang
(74) *Attorney, Agent, or Firm* — Pedersen and Company, PLLC; Ken J. Pedersen; Barbara S. Pedersen

(57) ABSTRACT

Magnetic materials and methods exhibit large magnetic-field-induced deformation/strain (MFIS) through the magnetic-field-induced motion of crystallographic interfaces. The preferred materials are porous, polycrystalline composite structures of nodes connected by struts wherein the struts may be monocrystalline or polycrystalline. The materials are preferably made from magnetic shape memory alloy, including polycrystalline Ni—Mn—Ga, formed into an open-pore foam, for example, by space-holder technique. Removal of constraints that interfere with MFIS has been accomplished by introducing pores with sizes similar to grains, resulting in MFIS values of 0.12% in polycrystalline Ni—Mn—Ga foams, close to the best commercial magnetostrictive materials. Further removal of constraints has been accomplished by introducing pores smaller than the grain size, dramatically increasing MFIS to 2.0-8.7%. These strains, which remain stable over >200,000 cycles, are much larger than those of any polycrystalline, active material.

23 Claims, 23 Drawing Sheets

(56) References Cited

U.S. PATENT DOCUMENTS

| | | | | |
|---|---|---|---|---|
| 4,364,013 | A | 12/1982 | Castera et al. | |
| 5,850,109 | A | 12/1998 | Mock et al. | |
| 5,958,154 | A | 9/1999 | O'Handley et al. | |
| 6,034,887 | A | 3/2000 | Gupta et al. | |
| 6,037,682 | A | 3/2000 | Shoop et al. | |
| 6,307,241 | B1 | 10/2001 | Awschalom et al. | |
| 6,433,465 | B1 | 8/2002 | McKnight et al. | |
| 6,515,382 | B1 | 2/2003 | Ullakko | |
| 6,655,035 | B2 | 12/2003 | Ghandi et al. | |
| 6,909,224 | B2 | 6/2005 | Ghandi et al. | |
| 6,927,475 | B2 | 8/2005 | Lu | |
| 6,984,902 | B1 | 1/2006 | Huang et al. | |
| 6,995,496 | B1 | 2/2006 | Hagood, IV et al. | |
| 7,009,310 | B2 | 3/2006 | Cheung et al. | |
| 7,020,015 | B1 | 3/2006 | Hong et al. | |
| 7,059,201 | B2 | 6/2006 | Prakash et al. | |
| 7,119,495 | B2 | 10/2006 | Or et al. | |
| 7,564,152 | B1 | 7/2009 | Clark et al. | |
| 2006/0003185 | A1 | 1/2006 | Parkin | |
| 2006/0130758 | A1 | 6/2006 | Lohokare et al. | |
| 2006/0222904 | A1 | 10/2006 | Hsia et al. | |
| 2008/0139399 | A1* | 6/2008 | Fonnum et al. | 506/9 |
| 2008/0143195 | A1 | 6/2008 | Hampikian et al. | |
| 2008/0225575 | A1 | 9/2008 | Mullner et al. | |
| 2009/0092817 | A1 | 4/2009 | Mullner et al. | |
| 2009/0167115 | A1 | 7/2009 | Tucker et al. | |
| 2010/0231433 | A1* | 9/2010 | Tishin et al. | 342/1 |

OTHER PUBLICATIONS

Mullner et al., Nanomechanics and magnetic structure of orthorhombic Ni-Mn-Ga martensite, Materials Science & Engineering A, 2008, pp. 66-72, 481-482, Eslevier.

Mullner et al., Micromechanics of magnetic-field-induced twin-boundary motion in Ni-Mn-Ga magnetic shape-memory alloys, Solid-to-Solid Phase Transformations in Inorganic Materials, May 29-Jun. 3, 2005, pp. 171-185, vol. 2, TMS (The Minerals, Metals & Materials Society).

Mullner et al., The force of a magnetic/electric field on a twinning dislocation, Phys. Stat. Sol. (b), 1998, pp. R1-R2, 208, Rapid Research Notes.

Pan et al., Micromagnetic study of Ni2MnGa under applied field (invited), Journal of Applied Physics, May 1, 2000, pp. 4702-4706, vol. 87, No. 9, American Institute of Physics.

Sozinov et al., Crystal structures and magnetic anisotropy properties of Ni-Mn-Ga Martensitic phases with giant magnetic-field-induced strain, IEEE Transactions on Magnetics, Sep. 2002, pp. 2814-2816, vol. 38, No. 5, IEEE.

Sullivan, et al., Temperature- and field-dependent evolution of micromagnetic structure in ferromagnetic shape-memory alloys, Physical Review B, 2004, pp. 1-8, 70:094427, The American Physical Society.

Ge et al., Various magnetic domain structures in a Ni-Mn-Ga martensite exhibiting magnetic shape memory effect, Journal of Applied Physics, Aug. 15, 2004, pp. 2159-2163, vol. 96, No. 4, American Institute of Physics.

Greer et al., Size dependence of mechanical properties of gold at the micron scale in the absence of strain gradients, Acta Materialia, 2005, pp. 1821-1830, 53, Elsevier.

Jaaskelainen et al., Magnetic field-induced strain and stress in a Ni-Mn-Ga alloy, J. Phys. IV, 2003, 112, 1005, EDP Sciences (Abstract only).

Murray et al., 6% magnetic-field-induced strain by twin-boundary motion in ferromagnetic Ni-Mn-Ga, Applied Physics Letters, Aug. 7, 2000, pp. 886-888, vol. 77, No. 6, American Institute of Physics.

Murray et al., Large field induced strain in single crystalline Ni-Mn-Ga ferromagnetic shape memory alloy, Journal of Applied Physics, May 1, 2000, pp. 5774-5776, vol. 87, No. 9, American Institute of Physics.

Tellinen et al., Basic properties of magnetic shape memory actuators, www.adaptamat.com, "Actuator 2002", Jun. 10-12, 2002, Bremen, Germany.

Suorsa et al., Applications of magnetic shape memory actuators, www.adaptamat.com, "Actuator 2002", Jun. 10-12, 2002, Bremen, Germany.

Lundgren et al., A magnetostrictive electric generator, IEEE Transaction on Magnetics, Nov. 1993, pp. 3150-3152, vol. 29, No. 6, IEEE.

Chernenko VA, Cesari E, Kokorin W, Vitenko IN, The Development of New Ferromagnetic Shape Memory Alloys in Ni-Mn-Ga System, Scripta Metal Mater 1995;33:1239.

Chernenko VA, L'Vov VA, Pasquale M, Besseghini S, Sasso C, Polenur DA, Magnetoelastic Behavior of Ni-Mn-Ga Martensitic Alloys, Int J Appl Electromag Mech 2000;12:3.

Chernenko VA, Müllner P, Wollgarten M, Pons J, Kostorz G, Magnetic Field Induced Strains Caused by Different Martensites in Ni-Mn-Ga Alloys, J de Phys IV, 2003;112:951.

Ferreira PJ, Vander Sande JB, Magnetic Field Effects on Twin Dislocations, Scripta Mater 1999;41:117.

Jääskeläinen A, Ullakko K, Lindroos VK, Magnetic Field-Induced Strain and Stress in a Ni-Mn-Ga Alloy, J de Phys IV, 2003;112:1005.

Murray SJ, Marioni M, Allen SM, O'Handley RC, Lograsso TA, 6% Magnetic-Field-Induced Strain by Twin-Boundary Motion in Ferromagnetic Ni-Mn-Ga, Appl Phys Lett 2000a;77:886.

Murray SJ, Marioni M, Kukla AM, Robinson J, O'Handley RC, Allen SM, Large Field Induced Strain in Single Crystalline Ni-Mn-Ga Ferromagnetic Shape Memory Alloy, J Appl Phys 2000b;87:5774.

Müllner P, Between Microscopic and Mesoscopid Descriptions of Twin—Twin Interaction, Int J Mater Res (Z f Metallk) 2006;97:205.

Müllner P, Chernenko VA, Wollgarten M, Kostorz G, Large Cyclic Deformation of a Ni-Mn-Ga Shape Memory Alloy Induced by Magnetic Fields, J Appl Phys 2002;92:6708.

Müllner P, Chernenko VA, Kostorz G, A Microscopic Approach to the Magnetic-Field-Induced Deformation of Martensite (Magnetoplasticity), J Magn Magn Mater 2003a;267:325.

Müllner P, Chernenko VA, Kostorz G, Stress-Induced Twin Rearrangement Resulting in Change of Magnetization in a Ni-Mn-Ga Ferromagnetic Martensite, Scripta Mater 2003b;49:129.

Müllner P, Chernenko VA, Kostorz G, Large Magnetic-Field-Induced Deformation and Magneto-Mechanical Fatigue of Ferromagnetic Ni-Mn-Ga Martensites, Mater Sci Eng A 2004;387:965.

Müllner P, Ullakko K, The Force of a Magnetic/Electric Field on a Twinning Dislocation, Phys Stat Sol (b) 1998;208:R1.

Pond RC, Celotto S, Special Interfaces: Military Transformations, Intern Mater rev 2003;48:225.

Sozinov A, Likhachev AA, Lanska N, Ullakko K, Giant Magnetic-Field-Induced Strain in NiMnGa Seven-Layered Martensitic Phase, Appl Phys Lett 2002;80:1746.

Straka L, Heczko O, Magnetization Changes in Ni-Mn-Ga Magnetic Shape Memory Single Crystal During Compressive Stress Reorientation, Scripta Mater 2006;54:1549.

Soursa I, Pagounis E, Ullakko K, Magnetization Dependence on Strain in the Ni-Mn-Ga Magnetic Shape Memory Material, Appl. Phys. Lett. 2004a; 23:4658.

Suorsa I, Tellinen J, Ullakko K, Pagounis E, Voltage Generation Induced by Mechanical Straining in Magnetic Shape Memory Materials, J Appl Phys 2004b;95:8054.

Tickle R, James RD, Magnetic and Magnetomechanical Properties of Ni2MnGa, J Magn Magn Mater 1999;195:627.

Ullakko K, Magnetically Controlled Shape Memory Alloys: A New Class of Actuator Materials, J Mater Eng Perf, 1996;5:405.

Ullakko K, Huang JK, Kantner C, O'Handley RC, Kokorin VV, Large Magnetic-Field-Induced Strains in Ni2MnGa Single Crystals, J Appl Phys 1996;69:1966.

Likhachev et al., Magnetic-field-cotrolled twin boundaries motion and giant magneto-mechanical effects in Ni-Mn-Ga shape memory alloy, Physics Letters, Oct. 2, 2000, pp. 142-151, vol. A 275, Elsevier Science.

Li et al., Some aspects of strain-induced change of magnetization in a Ni-Mn-Ga single crystal, Scripta Materialla, available online Jul. 6, 2005, pp. 829-834, vol. 53, Elsevier Ltd.

Boonyongmaneerat et al., Increasing Magnetoplasticity in Polycrystalline Ni-Mn-Ga by Reducing Internal Constraints through Porosity, Physical Review Letters, Dec. 14, 2007, pp. 247201-1 to 4, vol. 99, The American Physical Society.

(56) References Cited

OTHER PUBLICATIONS

PCT Search Report and the Written Opinion, PCT/US07/82021, May 21, 2008, Applicant: Boise State University.
PCT Search Report and the Written Opinion, PCT/US37/84732, May 22, 2008, Applicant: Boise State University.
PCT Search Report, PCT/US20081075062, May 18, 2009, Applicant: Boise State University.
Wang, et al., Energy harvesting by magnetostrictive materials (MsM) for powering wireless sensors in SHM, SPIE/ ASME Best Student Paper Presentation Contest, SPIE Smart Structures and Materials and NDE and Health Monitoring, 14th International Symposium (SSNo7), Mar. 18-22, 2007.
Karaman et al., Energy harvesting using martensite variant reorientation mechanism in a NiMnGa magnetic shape memory alloy, Applied Physics Letters, 90, 172505 (2007).
Chernenko, et al., Martensite transformation in ferromagnets: experiment and theory, J Magn Mater 1990;16-197; 859.
J. Cui, T. W. Shield, R. D. James, Phase transformation and magnetic anisotropy of an iron-palladium ferromagnetic shape-memory alloy, Acta mater. 52, 35 (2004).
A. Fujita, K. Fukamichi, F. Gejima, R. Kainuma, K. Ishida, Magnetic properties and large magnetic-field-induced strains in off-stoichiometric Ni-Mn-Al Heusler alloys, Appl. Phys. Lett. 77, 3054 (2000).
R. D. James and M. Wuttig, Magnetostriction of martensite, Phil. Mag. A 77, 1273 (1998).
G. Kostorz and P. Müllner, Z. F., Magnetoplasticity, Metallkd. 96, 703 (2005).
H. H. Liebermann and C. D. Graham, Jr., Plastic and Magnetoplastic Deformation of Dy Single Crystals, Acta Met. 25, 715 (1976).
R. Santamarta, E. Cesari, J. Font, J. Muntasell, J. Pons, J. Dutkiewicz, Effect of atomic order on the martensitic transformation of Ni-Fe-Ga alloys, Scripta Mater. 54, 1985 (2006).
A. S. Sologubenko, P. Müllner, H. Heinrich, K. Kostorz, Z. F., on the plate-like-phase formation in MnAl-C alloys, Metallkd. 95, 486 (2004).
N. I. Vlasova, G. S. Kandaurova, N. N, Shchegoleva, J., Effect of the polytwinned microstructure parameters on magnetic domain structure and hysteresis properties of the CoPt-type alloys, Magn. Magn. Mater. 222, 138 (2000).
T. Wada, T. Tagawa, M. Taya, Martensitic transformation in Pd-rich Fe-Pd-Pt alloy, Scripta Mater. 48, 207 (2003).
M. Wuttig, J. Li, C. Craciunescu, A New Ferromagnetic Shape Memory Alloy System, Scripta Mater. 44, 2393 (2001).
J. H. Zhang, W. Y. Peng, S. Chen, T.Y. Hsu (X. Zaoyao), Magnetic shape memory effect in an antiferromagnetic -Mn-Fe(Cu) alloy, Appl. Phys. Lett. 86, 022506 (2005).

* cited by examiner a b a b c

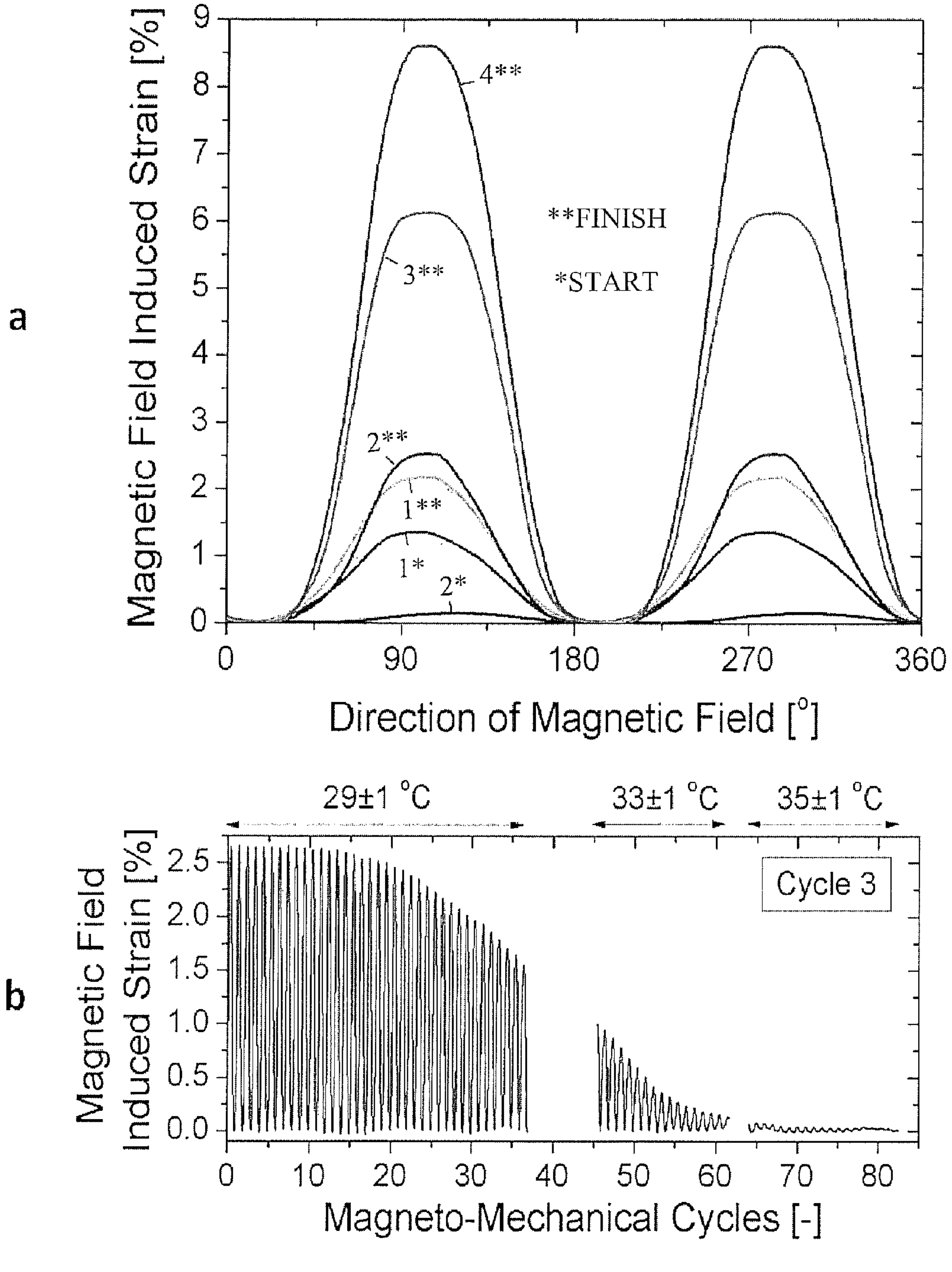
FIGURE 19 (a and b)

Figure 24a
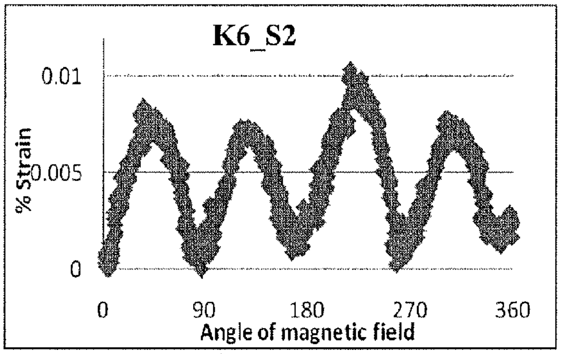
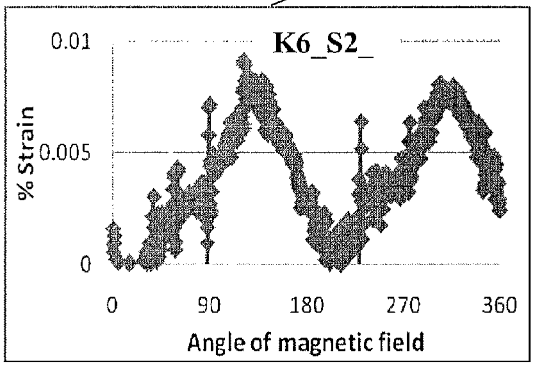
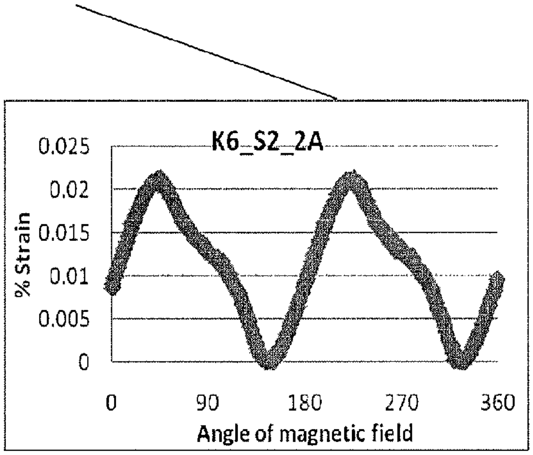
Figure 24b
Figure 24c 71.0% porosity 72.3% porosity

POLYCRYSTALLINE FOAMS EXHIBITING GIANT MAGNETIC-FIELD-INDUCED DEFORMATION AND METHODS OF MAKING AND USING SAME

This application claims benefit of Provisional Application Ser. No. 61/227,044, Jul. 20, 2009, the entire enclosure of which is incorporated herein by this reference, and this application is a continuation-in-part of Non-Provisional application Ser. No. 12/203,112, filed Sep. 2, 2008, which claims benefit of 60/969,018, filed Aug. 30, 2007, the disclosures of which are also incorporated herein by this reference.

This invention was made with government support under Grant DMR0804984, DMR0805064, and DMR0502551 awarded by the National Science Foundation. The government has certain rights in the invention.

FIELD OF THE INVENTION

The invention relates porous polycrystalline magnetic material having struts between nodes of the material which produce large reversible strain in response to an actuating magnetic field.

RELATED ART

Magnetic shape-memory alloys (MSMAs) have emerged into a new field of active materials enabling fast large-strain actuators. MSMA with twinned martensite tend to deform upon the application of a magnetic field. The magnetic-field-induced deformation can be reversible (magnetoelasticity) or irreversible (magnetoplasticity) after removal of the magnetic field. After first results had been obtained in 1996, magnetoplasticity has been studied intensively for off-stoichiometric $Ni_2MnGa$ Heusler alloys for which large magnetic-field-induced strains result from a large spontaneous strain in combination with a large magnetic anisotropy constant and high magnetic and martensitic transformation temperatures. The magnetoplastic effect is related to the magnetic-field-induced displacement of twin boundaries. On the microscopic scale, a twin boundary moves by the motion of twinning dislocations, a process which can be triggered by a magnetic force on the dislocation. In monocrystalline $Ni_2MnGa$, the cooperative motion of twinning dislocations finally leads to a strain of up to 10%, depending on martensite structure, and crystal orientation and quality.

Large magnetic-field-induced strains have so far been measured for magnetic shape-memory alloy single crystals. Growth of single crystals is difficult (in terms of maintaining alloy purity) and slow, and thus expensive. When growing alloy single-crystals, segregation can often not be avoided and is particularly strong for Ni—Mn—Ga. Segregation is adding to the difficulty of growing reproducibly the single crystals with identical composition and crystal structure, which depends strongly on composition. Segregation can be avoided through quenching which however leads to a polycrystalline microstructure. It is, thus, for various reasons desirable to obtain MSMAs in polycrystalline form. Several attempts have been made to demonstrate magnetic-field-induced deformation in polycrystalline MSMA. Magnetic-field-induced strains of $1.4\times10^{-4}$ (0.014%) are considered "relatively large". Efforts were undertaken to improve the strain by producing severely textured alloys. Based on magnetic results, it was assumed that magnetic-field-induced twin boundary motion takes place in thin ribbons. However, strain measurements for this work revealed a total strain of only $2\times10^{-5}$ (0.002%).

Larger magnetic-field-induced strains (in the order of 0.01 or 1%) were reported for experiments where a magnetic field was applied during the martensitic phase transformation or when the sample was pre-stressed. These are valuable results and potentially important for certain applications. One of the main advantages of magnetoplasticity, however, is the independence of temperature and applied stress. Unlike the shape memory effect which makes use of temperature as an actuating parameter, magnetoplasticity takes place at constant temperature and therefore is fast.

No significant magnetic-field-induced deformation has been obtained so far for polycrystalline MSMA. The hindrance of magnetoplasticity in polycrystalline MSMAs is related to the micromechanism of magnetoplasticity, i.e. the motion of twinning dislocations (or disconnections) which is impeded by interfaces including twin boundaries and grain boundaries. Grain-boundary hardening is an efficient strengthening mechanism in metals and, therefore, suppresses also twin boundary motion in MSMAs. One strategy of the present inventors for improving magnetoplasticity has been to remove some of the grain boundaries and replace them by voids, for example, bulk alloys are replaced by alloy "foams". Further improvement in magnetoplasticity has been achieved by the present inventors by producing alloy foams with bimodal pore size distribution.

SUMMARY OF THE INVENTION

A construct of magneto-mechanically active material including magnetic shape-memory alloys is proposed that enables large magnetic-field-induced strains (MFIS) without the requirement of single crystals. The construct comprises a polycrystalline composite of pores, struts and nodes. The struts connect nodes of the material in three dimensions to create a collection of pores, or cages. The pores may be open or closed, as in open-cell and closed cell foams, for example. Special adaptations in pore structure of the preferred materials are believed to reduce constraints by grain boundaries that would otherwise inhibit twin boundary motion.

The struts may be monocrystalline or polycrystalline. Preferably, if any strut is monocrystalline, a twin boundary extends transversely across the entire strut. Preferably, if any strut is polycrystalline, it has a "bamboo" grain structure, which means that the grain boundaries traverse the entire width of the strut, and no grain boundary is parallel to the longitudinal axis of the strut. This way, in the preferred embodiments, grain boundary interference that suppresses twin boundary motion is minimized.

A strut may be long and thin, or it may also be as wide as it is long. In this latter case, the strut may be more accurately referred to as a "wall" between nodes. The preferred grain structure and free surfaces of the struts enable a strong strain response of the struts to an actuating magnetic field.

Materials of the present invention are preferably produced with a space holder technique known as replication. According to this preferred technique, dissolvable ceramics and salts including $NaAl0_2$ are infiltrated into a molten alloy to create spaces of ceramic/salt within the alloy which are dissolved out after the alloy has cooled to solid, leaving pores in the alloy. However, it is also contemplated by the inventors that other techniques for creating void spaces in the solid magnetic material may be used. For example, straight or jumbled bundles of fibers of the magnetic material may be fixed by sintering to create the requisite porosity. Also for example, chips or particulate bits of the magnetic material may be fixed by sintering to create the requisite porosity. Other conventional techniques may also be used.

In an especially-preferred embodiment, materials are made according to the space holder technique, or other techniques, which feature a pore size distribution having more than a single size range of pores. Preferably, in addition to large pores, pores smaller than the grain size are introduced to further reduce constraints on twin boundary motion and dramatically increase MFIS.

The magnetic shape-memory alloy foams may be beneficial in actuator, sensor, and active micro-damping applications, due to combined features of long stroke, fast response, and light weight. They may be beneficial, for example, as fast actuators with long stroke and high precision (e.g. for engine valves and ultra fast high precision scanners and printers); as long stroke, low force, light-weight, fast-response actuators for aeronautic and space applications; and as energy-harvesting devices. Beyond their uses as actuators and sensors, these open-porosity foams allow fluid flow, making them potentially useful as micro-pumps (with the fluid being squeezed directly by the foam deformation), micro-valves, and magnetocaloric materials (where the high surface to volume ratio of the foam enhances heat exchanges through a fluid).

BRIEF DESCRIPTION OF THE DRAWINGS

FIG. 2 is a photomicrograph of a polished cross-section of Ni—Mn—Ga foams according to one group of embodiments of the invention featuring large pore size, wherein

FIGS. 11*a* and *b* are optical micrographs of polished cross-sections of Ni—Mn—Ga foams, wherein FIG. 11*a* shows foam with a single range of large pores made with 355-500 μm $NaAlO_2$ powders.

FIGS. 12*a* and *b* are SEM micrographs of cut and etches surface of Ni—Mn—Ga foams showing the three-dimensional structure and connectivity of pores, wherein FIG. 12*a* is a micrograph of single pore size foam and FIG. 12*b* is a micrograph of dual pore foam portraying the two types of pores.

FIG. 13*a* is an optical micrograph at low magnification showing the small and large pores (black) within the Ni—Mn—Ga alloy (white).

FIG. 15*a* is at low magnification view showing small pores (A), and large pores (B). FIG. 15*b* is at higher magnification view of small pores (A) located in regions between large pores (B). FIG. 15*c* is at highest magnification image showing details of small pores and small struts.

FIGS. 18*a* and 18*b* are plots of MFIS vs. temperature for the thermal cycles (a) 1-4 and (b) 5-10, with filled symbols for heating and hollow symbols for cooling. FIG. 18*c* is a plot of the highest MFIS (just before and just after each phase transformation) vs. cycle number. (FIG. 19A shows details for the first 3 cycles of FIG. 18.) The dashed vertical lines indicate unmounted and remounting of the foam during interruptions of the thermal cycling.

FIGS. 19*a* and 19*b* portrays MFIS recorded during thermal cycling. FIG. 19*a* shows MFIS vs. magnetic field orientation during single magnetic cycles (numbers correspond to the thermal cycle, with superscripts "start" and "finish" referring to the strain before austenite start upon heating and after martensite finish upon cooling). FIG. 19*b* shows MFIS vs. magnetic cycle number during heating from the martensite phase to the austenite phase (third temperature cycle). The two gaps in the graph are required to accommodate data acquisition. During this time, the magnetic field continues rotating and the temperature continues increasing.

FIG. 24 illustrates a sample-tree of K6-S with MFIS results for one full revolution of the magnetic field.

DETAILED DESCRIPTION OF PREFERRED EMBODIMENTS

Figure 1:
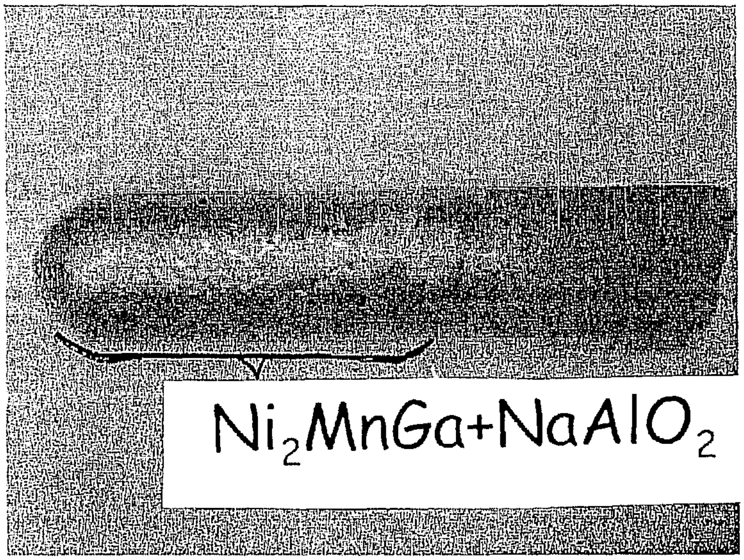
FIG. 1 is a photograph of a Ni—Mn—Ga specimen after infiltration of a $NaAl0_2$ powder preform according to an embodiment of the invention.

Referring to the Figures, there are shown several, but not the only, embodiments of the invented porous structure exhibiting large magnetic-field-induced deformation, and several, but not the only, methods for making and using said porous structure. FIGS. 1-10 focus mainly on single-pore-size distribution embodiments of the invention, wherein the single-size pores are large pores. FIGS. 11-26 focus mainly on embodiments of the invention that comprise more than one size of pores, specifically in these examples, two sizes of pores (large and small), and on comparisons between the single-pore-size and multiple-pore-size embodiments.

Large-Pore, Single-Pore-Size Embodiments $Ni_2MnGa$ replicated foams with open-cell porous structure were processed by the replication technique where a metallic melt is cast into a bed of space-holder materials that is leached out after solidification of the melt, resulting in open porosity replicating the structure of the space-holder. This method allows the creation of foams with fully-dense struts without macroscopic distortions. This method necessitates the selection of a space-holder with higher melting point than the alloy, very low reactivity with the melt and good removal ability. This technique has been used for low-melting alloys such as aluminum (typically using NaCl with a 801° C. melting point as space-holder) and has been recently demonstrated for foams created with higher melting alloys based on zirconium (using $BaF_2$ as space-holder) or nickel (using $NaAlO_2$). In the present work, the processing follows the general procedures described in Boonyongmaneerat Y, Chmielus M, Dunard D C, Müllner P, Physical Review Letters 2007: 99: 247201—incorporated herein by reference.

A $Ni_{50.6}Mn_{28}Ga_{21.4}$ (numbers indicate atomic percent) polycrystalline ingot was produced by vacuum casting of the elements Ni, Mn, and Ga. The material exhibits solidus and liquidus temperatures of ~1110° C. and ~1130° C., respectively. For the space-holder, $NaAlO_2$ powders with a size range of 355-500 μm were used, which were produced by cold pressing $NaAlO_2$ supplied by Alfa Aesar (Ward Hill, Mass.), sintering at 1500° C. for 1 hour in air, crushing and sieving. These sieved $NaAlO_2$ powders were then poured in a cylindrical alumina crucible with inner diameter 9.5 mm and sintered in air at 1500° C. for 3 hours to achieve a modest degree of bonding between the particles. Subsequently, an alumina spacer disc and the $Ni_2MnGa$ ingot were inserted into the crucible containing the sintered $NaAlO_2$ particles.

The crucible was heated to 1200° C. with a heating rate of 7° C./min, and maintained at this temperature for 15 minutes under high vacuum to insure full melting of the alloy. The melt was then infiltrated into the $NaAlO_2$ preform by applying a 80 kPa (800 mbar) pressure of 99.999% pure argon. After 3 minutes of infiltration, the system was furnace cooled under argon pressure. The total mass of preform (space holder material) and alloy was measured before and after infiltration. The weight loss was less than 0.4%. This corresponds to a maximum deviation of the final concentration compared to the ingot concentration of 0.4 atomic percent for each element. The as-cast specimen was removed from the crucible, cut into small discs with height and diameter of 3 mm and 9 mm, respectively, so that the infiltrated space-holder particles were fully exposed to the surfaces. Two specimens (A and B) were then submerged into an ultrasonically-agitated 10% HCl solution bath for 17 and 41 hours, respectively, to dissolve the space-holder.

The density of the two foams A and B was determined by helium pycnometry. Additional specimens were mounted and polished, and their microstructures were examined under optical microscopes. To observe twin relief and grain structures, the specimens were (i) heat-treated at 150° C. followed by cooling to room temperature and (ii) etched with nitric acid solution.

Four samples were prepared with the shape of a parallelepiped. The sizes were approximately 6×3×2 $mm^3$. The samples were subjected to a stepwise heat treatment (1000° C./1 h, 725° C./2 h, 700° C./10 h, 500° C./20 h) to homogenize at 1000° C. and to form the $L2_1$ order at temperatures between 725 and 500° C. For optical characterization, the samples were polished and etched in a solution of 30 vol.-% nitric acid (65% concentrated) in 70 vol.-% methanol.

Cyclic magneto-mechanical experiments were performed using a test set-up with a rotating magnetic field. Experimental details are given in Müllner P, Chernenko V A, Kostorz G, J Appl Phys 2004:95:1531—incorporated herein by reference. The sample was glued with its smallest face to a sample holder. A magnetic field of 0.97 T was rotated with up to 12,000 turns per minute. The rotation axis was perpendicular to the magnetic field direction. The sample was mounted to the sample holder such that the shortest edge of the sample was parallel to the rotation axis and the plane within which the magnetic field rotated was parallel to the largest face of the sample. The length of the longest edge of the sample was recorded as a function of field direction. For one full field rotation, magnetic shape-memory alloys expand and contract twice. One full turn of the magnetic field constitutes two magneto-mechanical cycles. The precision of the strain measurement on a 6 mm long sample is $2\times10^{-5}$ which corresponds to a relative error of 2% for a strain of $10^{-3}$. The precision of the displacement includes noise and bending due to magnetic torque.

Molten $Ni_2MnGa$ appeared to adequately wet both alumina crucible and $NaAlO_2$ particles without the presence of any adverse reaction, resulting in good infiltration of the alloy into the preform. As shown in FIG. 1, the as-cast specimen is composed of the metal-ceramic composite section at the bottom (left) and excess metal portion at the top (right). FIG. 1 is a photograph of a Ni—Mn—Ga specimen after infiltration according to an embodiment of the invention. The left part consists of a composite of space-holder ceramic and Ni—Mn—Ga foam while the right part is excess Ni—Mn—Ga alloy without spaceholder.

With the measured density of the $Ni_2MnGa$—$NaAlO_2$ composite of 5.7 g/cm$^3$ and the $NaAlO_2$ packing fraction of 36%, it is determined that the volume fraction of the metal and pore in the composite are 58% and 6%, respectively. Such low porosity value indicates that $Ni_2MnGa$ almost fully-infiltrated into the preform. The $NaAlO_2$ space-holder can be leached with 10% HCl solution fairly well, even though a thin, dark corrosive layer developed on the metal surfaces. Table 1 summarizes the final volume fractions of the materials in specimen sets A and B.

TABLE 1

Percent volume fraction of foam specimens following the dissolution treatments for 17 hours (A) and 41 hours (B).

| | Pct. Volume Fraction | | |
|---|---|---|---|
| Sample | Metal | Placeholder | Pore |
| A | 36 | 9 | 55 |
| B | 24 | 0 | 76 |

In set A, where specimens were submerged in the acidic solution for a shorter time, the dissolution of the preform was not fully completed, leaving 9% of $NaAlO_2$ residue within the structure. Nevertheless, it is observed that porosity of 55% is already much higher than anticipated based on the space-holder density (42%), and this is because $Ni_2MnGa$ was concurrently dissolved in the acid, albeit at relatively slow rate compared to the ceramic. For specimens of set B, leaching of the space-holder is nearly complete and metal dissolution was also quite extensive, resulting in a porosity of 76%.

Figure 2A:
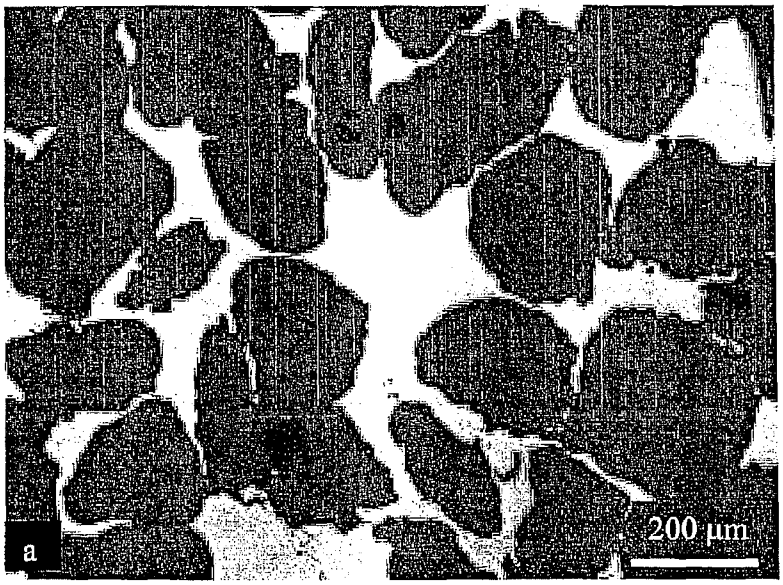
FIG. 2*a* is after etching for 17 hours.
Figure 2B:
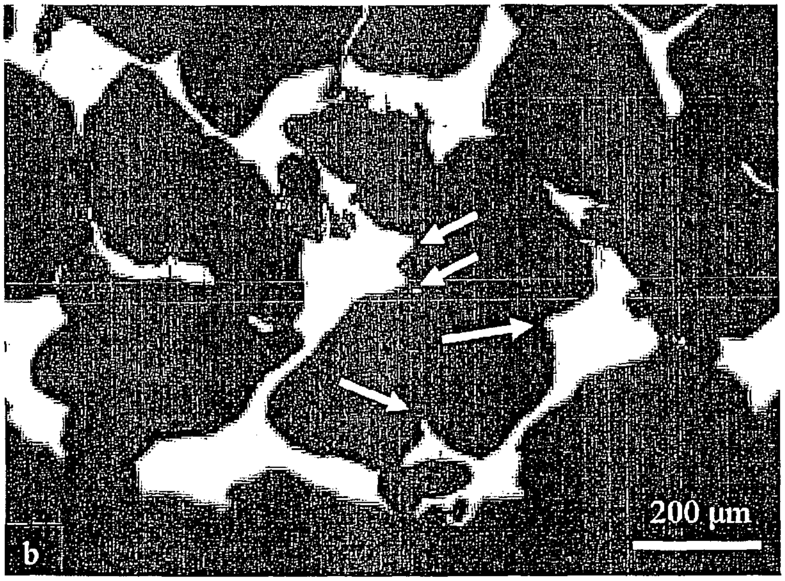
FIG. 2*b* is after etching for 41 hours.

FIGS. 2*a* and 2*b* show the microstructure of specimens A and B. FIGS. 2*a* and *b* are photomicrographs of a polished cross-section of Ni—Mn—Ga foam according to an embodiment of the invention after etching for 17 hours (FIG. 2*a*), and after etching for 41 hours (FIG. 2*b*). In FIG. 2*a*, most of the struts (light in this figure) are intact, the pores (dark in this figure) have the size of the former space-holder grains and the porosity is 55%. In FIG. 2*b*, which was subjected to a longer dissolution treatment, nodes and struts are thinner. In FIG. 2*b*, many struts are dissolved, the average pore size is larger than the size of the former space-holder grains and the porosity is 76%. Arrows mark truncated struts in FIG. 2*b*. In general, the architecture of the replicated foams can be described by nodes which are connected by relatively thin struts for a more open structure, or relatively thick walls for a more closed structure. Furthermore, nodes, walls and struts appear to be fully-dense, as expected for materials processed by casting.

Figure 3:
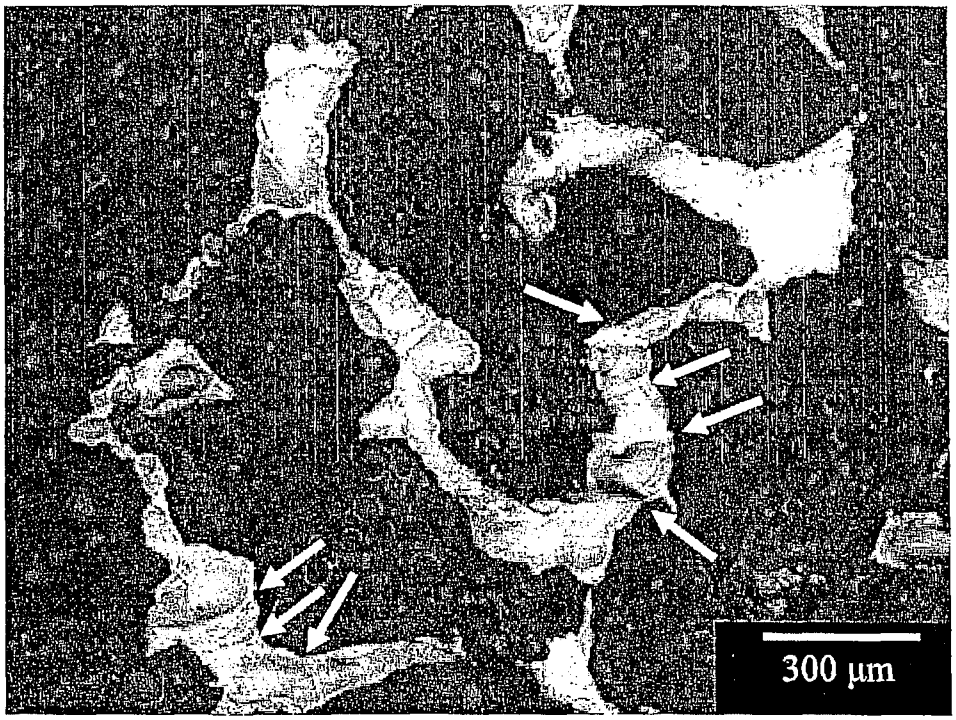
FIG. 3 is a photomicrograph of foam microstructure from FIG. 2(*b*), above, after etching, with arrows indicating grain boundaries.

The microstructure of the specimen B at room temperature after the heat treatment at 150° C. is presented in FIG. 3. FIG. 3 is a photomicrograph of foam microstructure according to an embodiment of the invention. Arrows mark some grain boundaries which expand across an entire strut. The grain boundaries subdivide the bamboo-like-structure of the struts, in that individual grain boundaries extending across the entire strut may be likened to "joints" in an elongated bamboo pole. Twins are visible in several grains, and are a signature of the martensitic phase. Grain boundaries (arrows) and twin boundaries are exposed. There are no grain boundary triple junctions, and no grain boundaries, along the longitudinal axis of struts. The grains are approximately equiaxed or globular, i.e. their length along the struts is similar to the strut diameter.

Figure 4B:
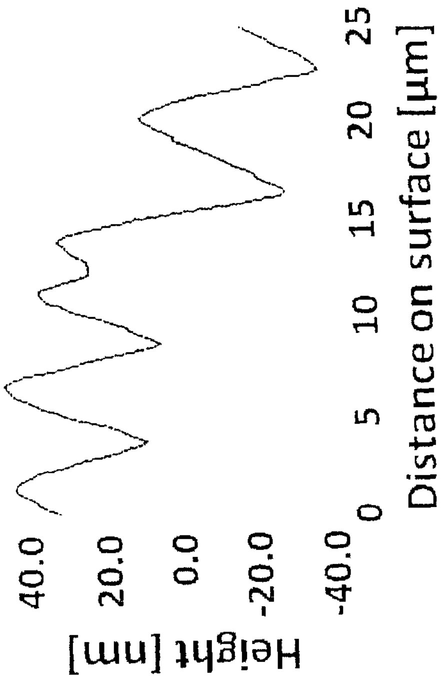
FIG. 4*b* illustrates a surface profile indicating a twin thickness of approximately 2 μm.
Figure 4A:
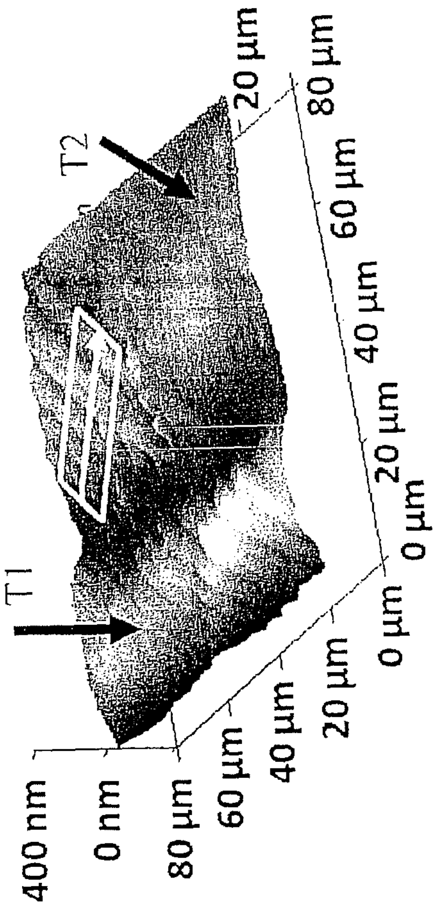
FIG. 4 illustrates a twin structure in a strut according to an embodiment such as that in FIG. 2(*b*) recorded with an atomic-force microscope (AFM), wherein the FIG. 4*a* height-image reveals two twin variants.

The twin structure appears more clearly as typical surface relief in an atomic force microscopy image (FIG. 4). Two twinning systems are visible in FIG. 4*a* with a twin thickness of a few micrometers. In FIG. 4A, the height-image reveals two twin variants T1 and T2 as indicated with black arrows. In FIG. 4*b*, the surface profile corresponding to the white/light box in FIG. 4*a* indicates a twin thickness of approximately 2 μm. The presence of twin relief patterns indicates that the martensitic transformation occurs above room temperature following the fabrication of the alloy foam.

Figure 5:
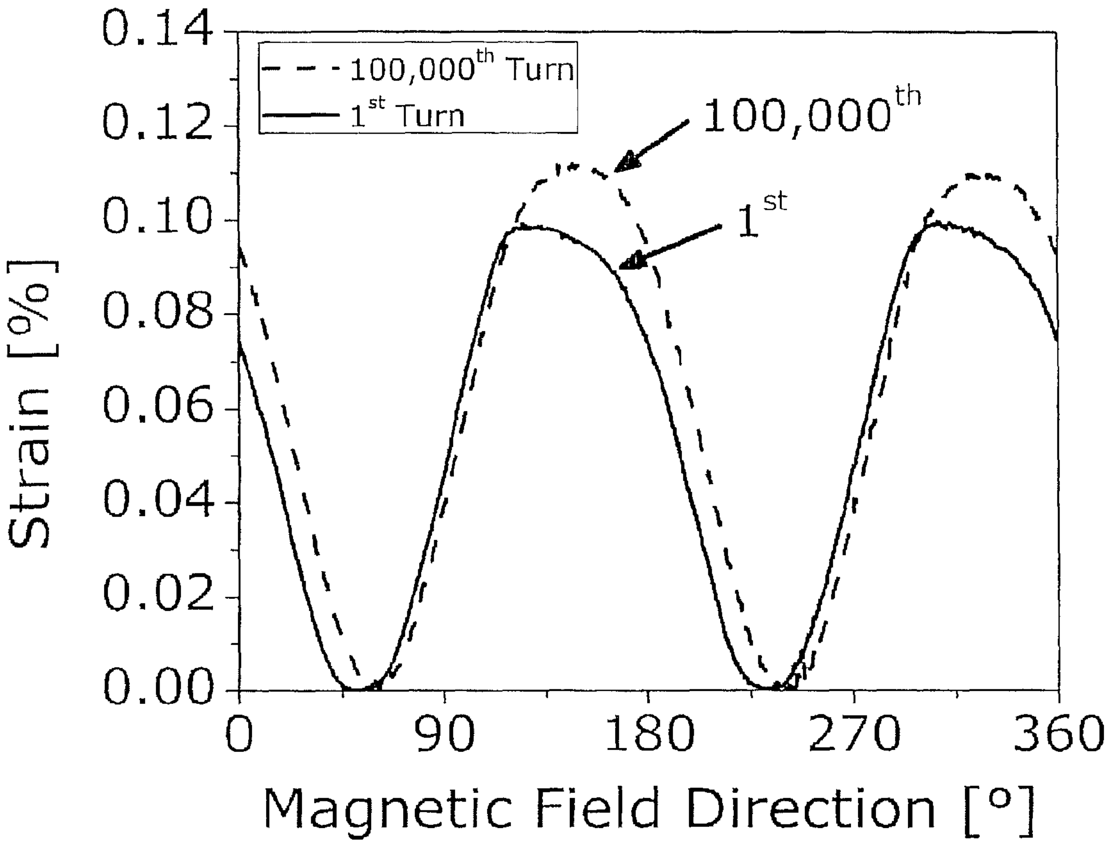
FIG. 5 is a graph of magnetic-field induced strain (MFIS) as a function of magnetic field direction for the sample from FIG. 2(*b*), above.

FIG. 5 displays results of the magneto-mechanical experiments with rotating magnetic field. FIG. 5 is a graph of magnetic-field induced strain (MFIS) of the sample from FIG. 2(*b*), plotted as a function of field direction. During one full rotation of the magnetic field, the sample expands and shrinks twice. In the first cycle (solid line), the strain is close to 0.1%. After 100,000 cycles (dashed line), the strain-angle profile changed slightly; the strain is exceeding 0.11%.

Figure 6:
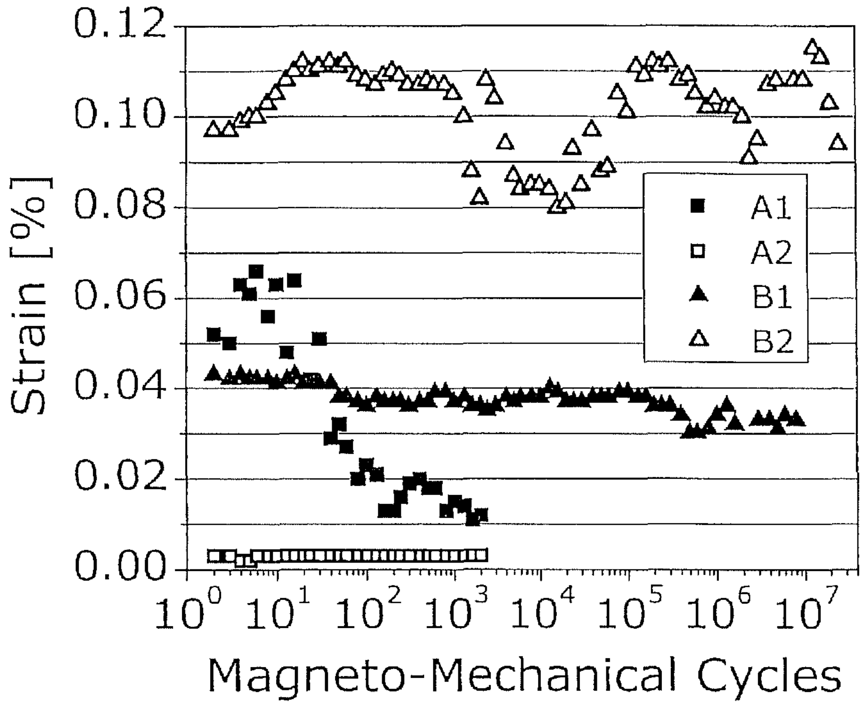
FIG. 6 is a graph of magnetic-field induced strain (MFIS) as a function of magneto-mechanical cycle number for four (4) Ni—Mn—Ga foam samples according to large-pore embodiments of the invention.

A comparison of the results of magneto-mechanical experiments of samples A1, A2, B1, and B2 is shown in FIG. 6. FIG. 6 is a graph of magnetic-field induced strain (MFIS) as a function of magneto-mechanical cycle number for embodiments of the invention. The samples with 55% porosity (A) have very small MFIS when not trained, heated and cooled with a magnetic load applied (A2) and more significant strain at the beginning when trained (A1). MFIS decays quickly for A1. Samples with 76% porosity (B) have larger MFIS, which stays constant over many magneto-mechanical cycles. The MFIS of A2 which did not undergo a thermo-magnetic treatment was 0.002% which is at the detection limit of the instrument. The sample A1, which underwent a thermo-magnetic treatment, displayed a MFIS of 0.06% during the first ten revolutions of the magnetic field. With increasing number of field revolutions, the MFIS decreased to about 0.01% after 1000 revolutions. The MFIS was largest for B2 (i.e. the sample with high porosity and without thermo-magnetic treatment). At the onset of magneto-mechanical actuation, the MFIS starts at a value of 0.097%, increases to a maximum of 0.11% where it stabilizes for nearly 1000 magneto-mechanical cycles and varies thereafter in the range between 0.08% and 0.115%. The MFIS of sample B1 is nearly constant 0.04% over up to one million magneto-mechanical cycles.

Figure 7A:
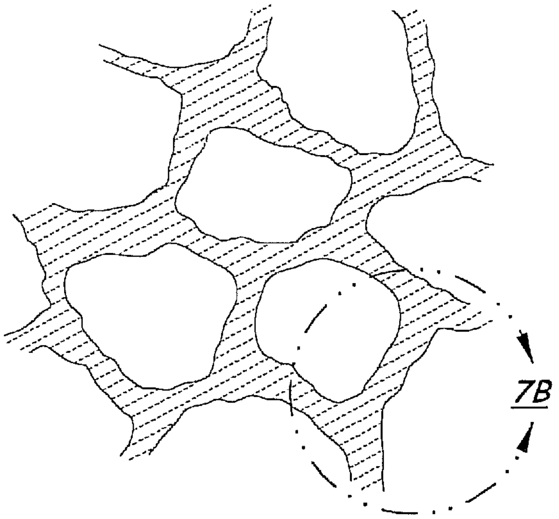
FIG. 7 includes a schematic, depiction (FIG. 7A) of a cross-section view of A large-pore alloy foam according to large-pore embodiments of the present invention, a detail view (FIG. 7B) of the foam showing two nodes (N) which are connected by one strut (S), and a closer-up detail view (FIG. 7C) of the strut (S) showing three (3) grains (G1, G2 and G3) separated by grain boundaries (GB).
Figure 7B:
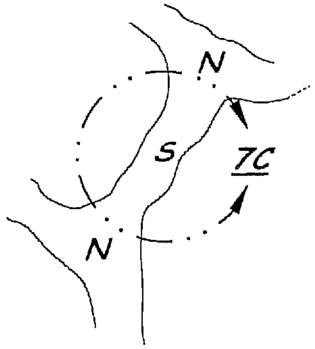
Figure 7C:
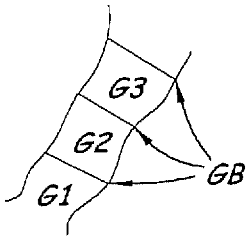

FIGS. 7A, B and C are schematic depictions of cross-section view (FIG. 7A) of one metal alloy foam of the present invention, and a detail view (FIG. 7B) of the foam showing two nodes (N) which are connected by one strut (S), and a closer-up detail view (FIG. 7C) of the strut (S). The transverse lines across the strut (S) marked with arrows are grain boundaries (GB) separating grains G1, G2 and G3. Such grain boundaries are also visible in FIG. 3, discussed above (marked also with arrows there). Grain boundaries are made visible through etching.

Figure 8A:
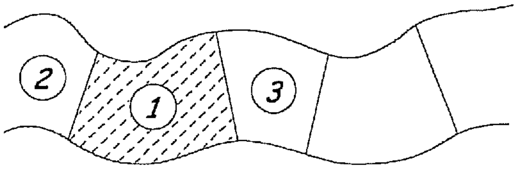
FIG. 8 provides a schematic comparison of a strut (FIG. 8A) containing three grains (1, 2, 3) with a "bamboo" structure according to an embodiment of the invention, and a single crystal (FIG. 8B) in an MFIS experiment with single crystal (1) pushing against a test fixture (2 and 3).
Figure 8B:
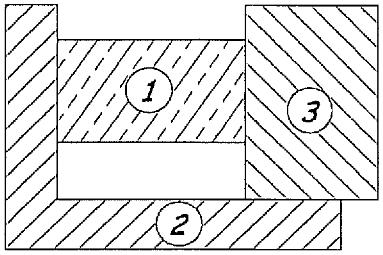

FIGS. 8A and B provide a schematic comparison of a strut (FIG. 8A) according to an embodiment of the invention and a single crystal as is would perform in an experiment (FIG. 8B). In the "bamboo" microstructure, the grain boundaries of grains 2 and 3 with grain 1 impose similar constraints on grain 1 as the contact areas of sample holder (2) and sled (3) with sample (1) do in single crystal experiments (FIG. 8B). Therefore, individual grains in the polycrystalline struts have properties similar to single crystals rather than polycrystals. The optical analysis of the struts reveals a bamboo-like grain microstructure (FIG. 8*a*). Thus, polycrystalline struts can be viewed as a linear assembly of single crystals. In experiments with a rotating magnetic field, crystals with an aspect ratio of about 2 to 2.5 are glued on two faces to the sample holder and the sled (see FIG. 8*b*). Sample holder and sled impose constraints to the single crystal similar to the neighboring grains (number 2 and 3 in FIG. 8*a*) on an intermediate grain (number 1 in FIG. 8*a*). When single crystals are subjected to a rotating magnetic field, cyclical strains of up to 10% are measured. This strain level represents the theoretical limit $\epsilon_{max}=1-c/a=0.1$ given by the ratio of the lattice parameters a and c. Thus, the constraints in the single crystal experiments which correspond to the constraints in the bamboo-structures of the struts do not significantly affect the MFIS. This implies that an isolated strut may deform freely. The strain would be reduced only due to the different orientation of individual grains. The effect of orientation distribution is discussed below.

Figure 9A:
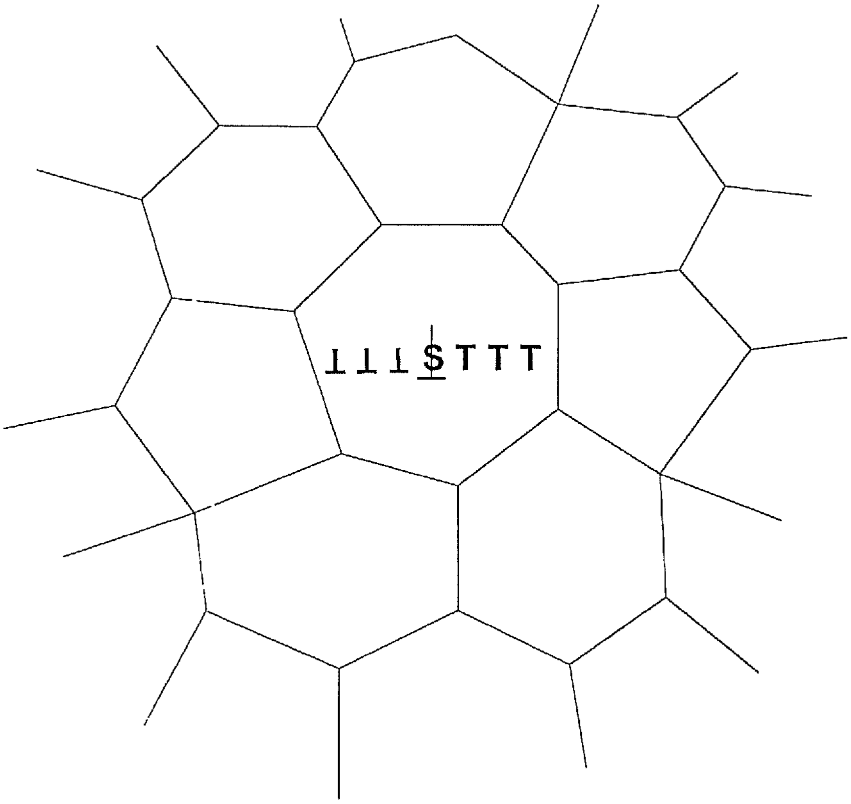
FIG. 9 is a schematic comparison of polycrystals plasticity (FIG. 9A) and twinning in nodes (FIG. 9B).
Figure 9B:
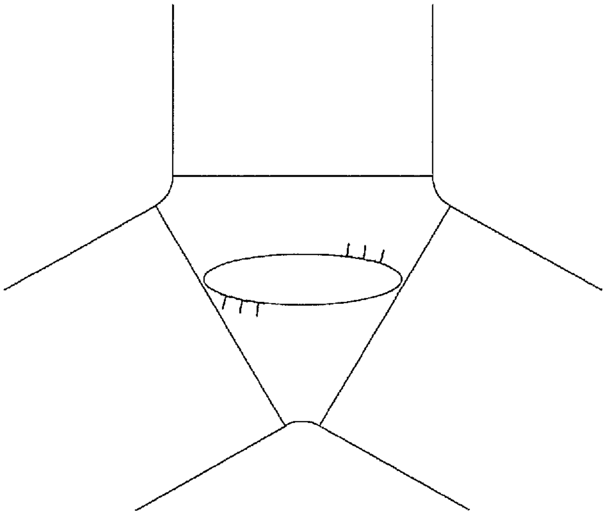

FIGS. 9A and B provide a schematic comparison of polycrystals plasticity (FIG. 9A) and twinning in nodes (FIG. 9B). In polycrystals, dislocations form pile-ups which produce a back-stress on dislocation sources causing significant hardening. For twinning in 'polycrystalline nodes', pile-ups of twinning dislocations suppress significant deformation. In polycrystals with individual grains fully embedded in a matrix of other grains, grain boundaries cause significant hardening. This hardening is due to the formation of dislocation pile-ups at grain boundaries, which cause a back stress on the dislocation sources (FIG. 9B). Magnetoplasticity is carried by twinning dislocations (more precisely twinning disconnections). The back-stress of dislocations piling up in polycrystals quickly increases the magneto-stress, which amounts to only a few MPa. Therefore, magnetoplasticity is suppressed to a large extend in polycrystals. A node in foam typically connects four struts. The grains of the struts meeting at the node make a grain structure similar to a grain embedded in a polycrystalline material (FIG. 9B). Therefore, nodes are constrained similarly as polycrystals and may not display magnetoplasticity.

If nodes and struts were connected in a simple serial chain, the total strain would follow a Wile of mixture, i.e. the struts would deform to the fullest and the nodes would not change their shape. Foams form three dimensional networks of struts which impose more constraints than present in a simple serial chain. The rule of mixture, therefore, provides an upper limit for MFIS. Assuming foam with a regular cubic structure, strut diameter d and cell size L=fd, porosity p, volume fraction e of struts (compared to total solid volume) and the geometry parameter f are related through $$p = \frac{f^3 - 3f + 2}{f^3},\ e = \frac{3f - 3}{3f - 2} \quad (1)$$

While all nodes are effective in suppressing deformation, only the component of the struts parallel to the direction along which the strain is detected effectively contribute to the experimental strain. When assuming that the strain is measured along one of the cube directions of the cubic model foam, one third of the struts contribute to deformation. The fraction $\tilde{e}$ of solid material which contributes to deformation then is $$\tilde{e} = \frac{e/3}{1 - 2e/3} \quad (2)$$

For single crystal experiments, strain is measured in <100> direction while the magnetic field is rotated in the {001} plane. With this geometry, the theoretical limit $\epsilon_{max}$ is achievable. For polycrystalline foam, grains are oriented arbitrarily. Irrespective of orientation, any grain will be subjected to the magnetic-field-induced rearrangement of twin-variants. However, the strain depends on crystal orientation. For rotation in the {001} plane, the strain in a direction inclined by $\phi$ to the <100> direction can be approximated as $\epsilon_{max}\cos\phi$. Assuming also a cosine dependence of the strain on the inclination $\theta$ of the {001} plane with respect to the plane of rotation, the average strain of individual grains is $$\langle\varepsilon\rangle = \langle\cos\varphi\rangle\langle\cos\theta\rangle\varepsilon_{max} = \frac{\varepsilon_{max}}{2} \quad (3)$$

Equations (1) and (2) can be numerically evaluated and multiplied with the average strain given in equation (3) to yield the expectation value of the strain as a function of porosity.

Figure 10:
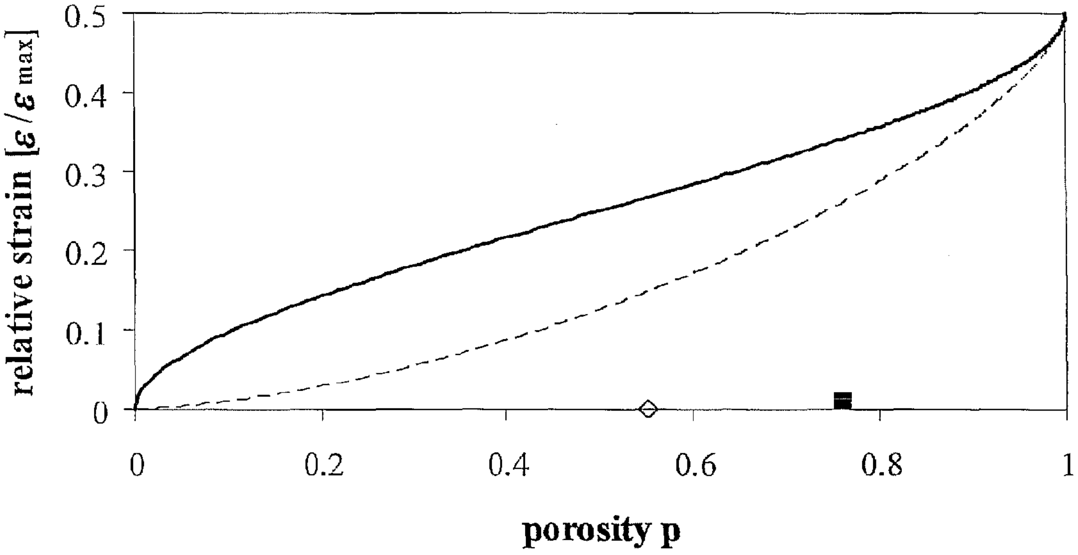
FIG. 10 is a graph depicting theoretical dependence of strain on porosity for embodiments of the invention where $\epsilon_{max}=1-c/a$ is the crystallographic limit. The diamond and square symbols present current large-pore embodiment results.

Relation (3) is displayed in FIG. 10. Without porosity (0 porosity, or 0% porosity), the entire sample is made of "node-material" for which magnetic-field induced strain is zero. With increasing porosity, the MFIS increases quickly at the beginning, more slowly for intermediate porosity, and again more quickly as the porosity approaches 100%. (1.0 on x axis in FIG. 10). The limit of the relative strain for large porosity is controlled by the texture, in the present assumptions, the maximum value for randomly textured foam is 0.5.

The experimental results are indicated with an open diamond for the sample with lower porosity (55% porosity, 0.002% MFIS, $\epsilon/\epsilon_{max}=0.0002$) and a solid square for the sample with higher porosity (76% porosity, 0.11% MFIS, $\epsilon/\epsilon_{max}=0.011$). While the trend of increasing strain with increasing porosity is following the model, there is a clear numerical discrepancy between experiment and model. The model predicts a strain roughly thirty times the experimental finding for the sample with 76% porosity.

The model assumes that the strain is proportional to the fraction of struts parallel to the direction of strain measurement. This is a good approximation for foam with all struts connected 'in series'. In such a case, there is no mutual interaction between struts. In reality, however, struts form a network. Some of the struts are linked 'in parallel'. For very large amounts of porosity ($p \approx 1$ and $f \gg 1$, i.e. when thin struts are spaced at large distance), there is little sterical hindrance and the effect of texture is still well described with a rule of mixture. For smaller amounts of porosity, however, sterical hindrance will reduce the strain significantly. For porosity 55% and 76%, the value of f is 2.4 and 3.1. Thus, the cell diameter is about three times the strut thickness, which is in good agreement with FIG. 1. Values of 2.4 and 3.1 may be too low to justify no sterical hindrance. In a zero-order attempt to account for sterical hindrance, one may assume that the potential to deform according to the rule of mixture is proportional to the porosity which modifies Eq. 3 to $$\langle\epsilon\rangle_{steric}=p\langle\epsilon\rangle \quad (4)$$

Eq. 4 is displayed in FIG. 10 with a dashed line. FIG. 9 is a graph depicting theoretical dependence of strain on porosity for embodiments of the invention where $\epsilon_{max}=1-c/a$ is the crystallographic limit. The solid line assumes no steric hindrance whereas the dashed line assumes a steric hindrance leading to a strain proportional to the porosity (Eq. 4). The symbols indicate experimental results for porosities 55% (open diamond) and 76% (solid square). The strain is reduced but not as severely as found in the experiments. Thus, sterical hindrance is stronger than reflected by Eq. 4 or/and there are further obstructions.

The model assumes perfect pores, i.e. pores which are completely empty and the surfaces of struts are clean. However, some pores of sample A are partially or completely filled with space-holder material. Struts which are connected with space-holder material are constrained similar to nodes and grains in polycrystals. Thus, these struts do not deform upon the application of a magnetic field and lead to a reduction off and an increase of steric hindrance. Steric hindrance and residues of space-holder may be sufficient to significantly reduce the magnetic-field-induced deformation. Both steric hindrance and residues may be reduced e.g. by increasing the etching time or choosing a different processing route. Therefore, it is likely that much larger MFIS will be achieved through optimizing of process parameters. For randomly textured polycrystalline foam, roughly 50% of the theoretical limit may be reached which amounts to an absolute strain of 5% in Ni—Mn—Ga with 14M (orthorhombic) structure.

The instant invention is unique regarding the combination of actuator properties. Magnetic shape-memory alloy foams combine large stroke, fast response, and light weight. Other materials might be faster but exhibit a much smaller strain (e.g. piezo ceramics) or they might exhibit larger strain but are much slower (e.g. hydraulics and thermally actuated shape-memory alloys including Nitinol). Some examples for uses of the foams according to the present invention are:

(i) Drug delivery systems where the drug is captured in the pores of the MSMA foam. The drug delivery system may be directed to a specific site using a low magnetic field. The drug may be released e.g. through (possible repeated) application of a stronger magnetic field which might be pulsed.

(ii) Micro-pump where the shape change of the pores is used to generate a variation of gas pressure.

(iii) Micro-valve for gas or liquid. The valve may be controlled through a variable magnetic field.

(iv) Active micro-damping device. The vibrations of a small system may be actively damped using the MSMA foam as a transducer element in combination with a suitable sensor and controller.

(v) Large-stroke, low force, small-weight, fast-response actuator for aeronautic and space applications. Due to the absence of gravity, actuators do not need to work against large loads. However, space applications require low weight and large stroke. Magnetic shape-memory alloys produce the largest stroke among all transducer materials and are in the form of foam particularly useful for space applications.

The only material type with properties similar to the large-pore embodiments described herein regarding strain and speed known to the instant inventors is bulk single crystalline MSMA. Bulk single crystals, however, are much heavier than MSMA polycrystalline foam. Furthermore, bulk single crystals require delicate, slow, and expensive processing. Processing of MSMA polycrystalline foam is faster, cheaper, and more flexible regarding processing parameters.

Multiple-Pore-Size Distribution Foam

As discussed above, very high MFIS (up to 10%) displayed by bulk monocrystalline Ni—Mn—Ga alloys is a true plastic strain produced by twin-boundary motion, which can be recovered by reverse twin motion through reorientation of the applied magnetic field and alternatively by mechanical compressive loading in a perpendicular direction. Fully recoverable MFIS over $>10^8$ magneto-mechanical cycles (MMC) has been reported for monocrystalline bulk Ni—Mn—Ga, with high actuation speed in the kHz regime being limited by eddy currents and inertia. Very large MFIS have previously only been achieved for single crystals. Due to constraints imposed by grain boundaries, the MFIS is near zero in randomly textured, fine-grained, polycrystalline Ni—Mn—Ga. To reduce these constraints and increase MFIS, coarse-grained, highly-textured, polycrystalline Ni—Mn—Ga has been produced by directional solidification and annealing. Though these materials did not deform directly when exposed to a magnetic field, they displayed a MFIS recovery of 1% after mechanical training, and a similar strain when magnetic actuation was combined with acoustic excitation.

The inventors' introduction of porosity in Ni—Mn—Ga according to embodiments of the invention is a very different approach for reducing constraints imposed by grain boundaries, while maintaining the ease of processing associated with casting polycrystalline Ni—Mn—Ga. Large pore, 76% open porosity, Ni—Mn—Ga foams (see Large-Pore, Single Pore Size Distribution Embodiments section above) exhibited MFIS as high as 0.12%, which are fully reversible over 30 million cycles. The architecture of these foams has been described above as a construct of struts linked together at nodes, wherein annealing insured that the bamboo grain structure developed, with each strut containing a few (or even a single) large "bamboo grains" spanning the full width of the struts. With this microstructure, each strut behaves like a single crystal with high MFIS. However, the struts are constrained by the nodes, which are polycrystalline and thus show near-zero MFIS. With a different pore distribution, the inventors address the issue of constraint by introducing fine (small) porosity within the nodes connecting the struts surrounding coarse (large) pores.

While the large-pore alloy foams may be said to exhibit large magnetic-field-induced strain (MFIS), additional embodiments of alloy foam and methods have been developed that may be said to exhibit giant MFIS. This giant MFIS is believed to result from the foam having a specially-adapted pore size distribution comprising more than one pore size, and preferably, both large pores and small pores, rather than the mono-modal pore size distribution of the large-pore embodiments. While it is currently preferred that two size ranges of pores be used (a group of large pores and a group of small pores, hence, "bimodal"), as shown in the following disclosure, the multi-modal pore distribution for alloy foam according to the invention may include more than two ranges of pore sizes, that is, a pore size distribution comprising "at least two size ranges of pores".

The especially-preferred embodiments may also be called "dual pore" embodiments, as opposed to "single pore"

embodiments, with "dual" and "single" referring to whether the embodiments have two different size ranges of pores or a single size range of pores.

It will be understood from this document, by one of average skill in the art, that each "size" or "size range" of pore in this context does not refer to a single, exact pore diameter, but a range of pore diameter/dimensions resulting, for example, from the size range of space-holding powder particles. For example, as described in detail below, a powder having particles in a range of 500-600 μm and a power having particles in a range of 75-90 μm, may be used to form large and small pores, respectively, and it is understand that there is approximately a 100 μm range, and a 15 μm range, of particles sizes in each of the two powders, respectively. Thus, the large pores may be expected to also exhibit approximately this 100 μm range, and the small pores may be expected to also exhibit approximately this 15 μm range. Still, the large and small pores may still be described as generally being in "two different sizes" or "two different size ranges" because the two size ranges (500-600 μm vs. 75-90 μm, or approximately 550 μm vs 82 μm) differ by much more than the 100 μm and 15 μm spread in the powder particle sizes.

The preferred small pores may be described as roughly an order of magnitude smaller than the large pores, or, more specifically, current preferred small pores are approximately 0.05-0.25 times the size of the large pores, and more preferably, 0.1-0.2 times the size of the large pores. While there is a range of pore sizes in each of the preferred "dual" pore size ranges, as explained above, the "dual" size ranges differ significantly and there is preferably no overlap in the size ranges.

Figure 11A:
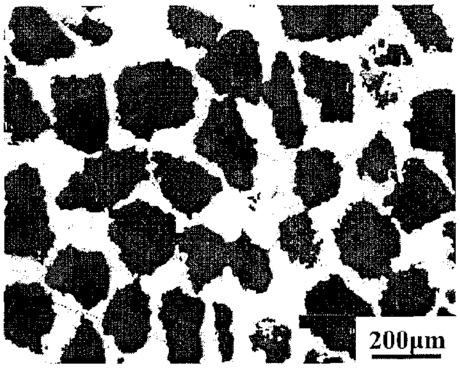
FIGS. 11*a* and *b* portray pore architecture of examples in two groups of embodiments, a single pore size (single range of pore size) embodiments and a dual pore size (two different ranges of pore size) embodiments.
Figure 11B:
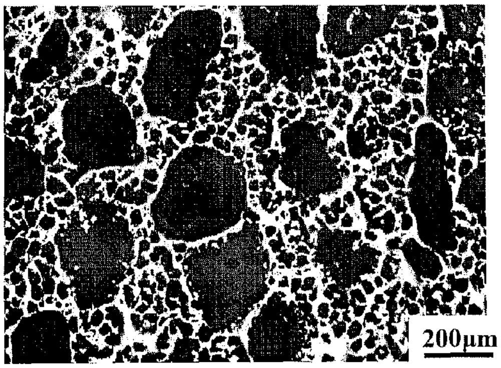
FIG. 11*b* shows foam with dual ranges, of both large pores and small pores, made with coarse (500-600 μm) and fine (75-90 μm) $NaAlO_2$ powders.
Figure 12A:
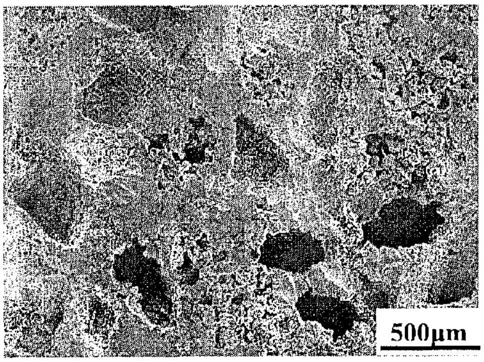
Figure 12B:
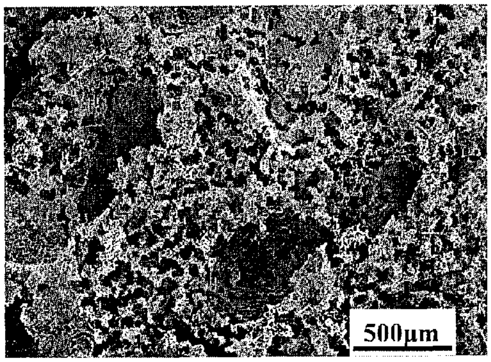

FIGS. 11*a* and *b*, and FIGS. 12*a* and *b*, As shown in FIG. 11*a*, show to best advantage differences between single pore and dual pore embodiments of alloy foam. In FIG. 11*a*, a single pore embodiment is formed by using 355-550 μm space-holding powder, and comprises entirely or mainly large pores generally on the order of the size of the powder used. In FIG. 11*b*, a dual pore embodiment ("bimodal pore" including large pores and small pores) is formed by using 500-600 μm space-holder powders for large pores, and 75-90 μm space-holder powders for small pores, and comprises pores generally in those two significantly different size ranges. FIGS. 12*a* and *b* are SEM micrographs of cut and etches surfaces of Ni—MN—Ga large-pore and bimodal-pore foam, respectively, such as those shown in FIGS. 11*a* and *b*.

Figure 13A:
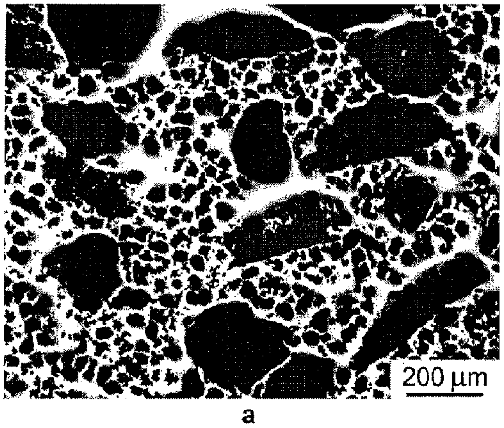
FIGS. 13*a* and *b* portray a polished cross-section of Ni—Mn—Ga foam with dual pore size, such as in FIGS. 11B and 12B.
Figure 13B:
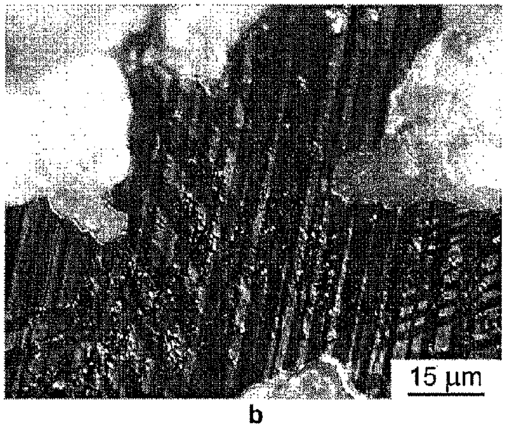
FIG. 13*b* is an optical micrograph of twins (colored bands made visible by cross-polarization), extending entirely from pores to pores (white).
Figure 14:
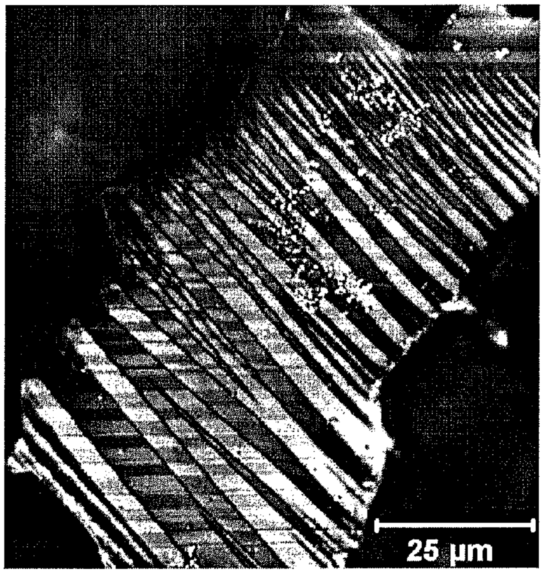
FIG. 14 is an optical micrograph of polished cross-section of porous Ni—Mn—Ga billet in the immediate vicinity of the foam tested magneto-mechanically. Cross-polarization provides color contrast for twins, which are extending from pore to pore (dark gray).

The present, bimodal pore foams are produced by the same replication method, using sodium aluminate powders as temporary place holder, previously developed for foams with large pore size. A bimodal pore size distribution is used to allow for rapid and complete removal of the sodium aluminate, which would be very difficult to achieve with a monomodal fine porosity. FIG. 13*a* shows a polished cross-section of the foam, with 62% porosity, illustrating the bimodal pore size distribution (the dark portions being pores). FIG. 13*b* shows, at higher magnification, the twin structure (dark portions) made visible by polarized light: twins span fully across individual monocrystalline struts. A further example is given in FIG. 14. Large pores make, by volume, the majority of the porosity in the foam and the corresponding nodes contain a multitude of smaller pores, which create a second population of much finer struts and nodes. Single grains contain multiple small pores and nodes, and twins spanning across entire large struts ensure the unhindered motion of twin boundaries.

Figure 15A:
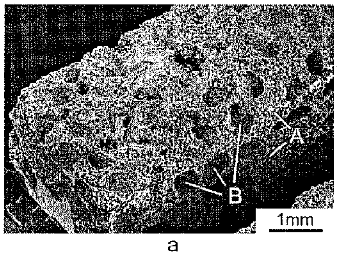
FIGS. 15*a-c* show scanning electron micrographs of Ni—Mn—Ga foam with bimodal pore size distribution.
Figure 15B:
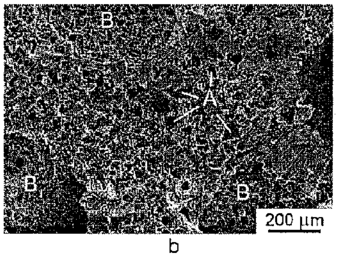
Figure 15C:
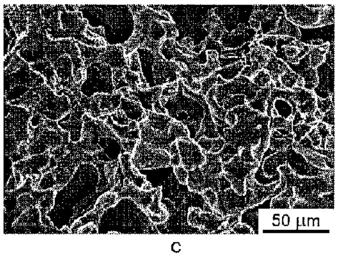

FIGS. 15*a-c* show scanning electron micrographs (SEM) of the bimodal pore structure in more detail. These SEM images are of dual pore foam according to embodiments of the invention displaying MFIS of up to 8.7% after thermo-magneto-mechanical training. At lowest magnification (FIG. 15*a*), the large pores (called out as letter B) are clearly visible while the small pores (called out as letter A) are hard to see. At intermediate magnification (FIG. 15*b*), both pore populations can be seen. At the highest magnification (FIG. 15*c*), only the small pores are smaller than the field of view.

Figure 16:
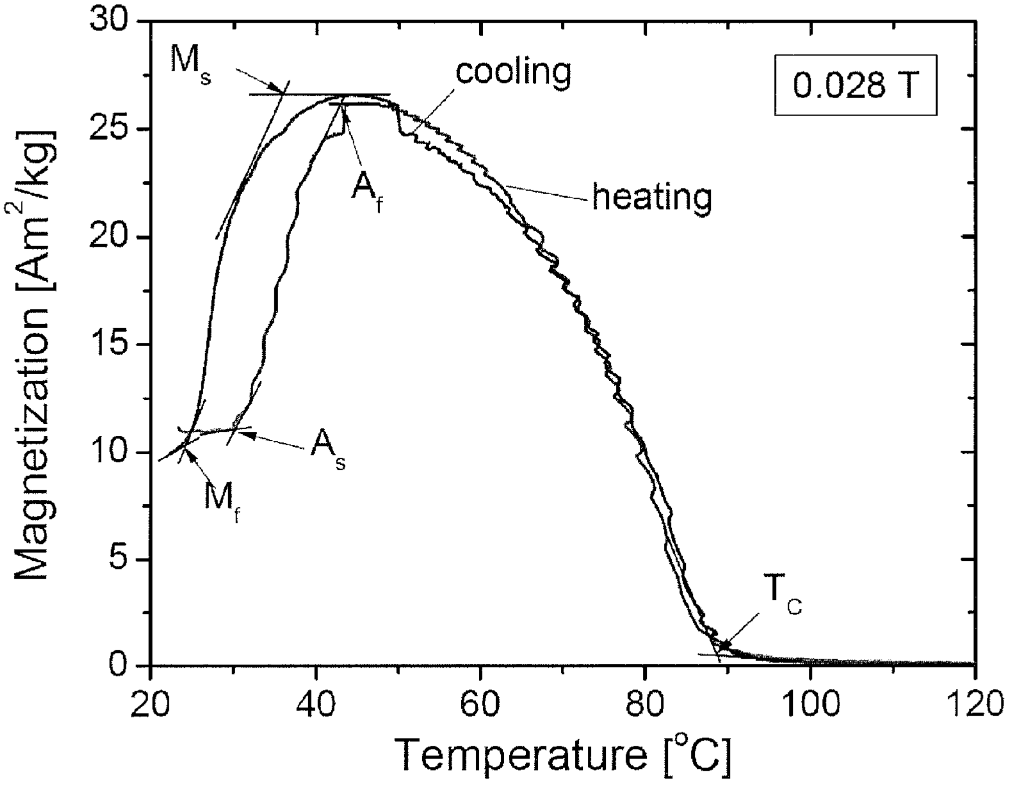
FIG. 16 illustrates VSM measurements of magnetization as a function of temperature during the martensite-austenite phase transformation of the foam. The graph shows the magnetization curve with an applied magnetic field of 0.028 T revealing the martensite, austenite and magnetic transformation temperatures.

Temperature-dependent measurement of magnetization with a vibrating sample magnetometer revealed the phase transformation temperatures of the foam to be 30 and 43° C. for the austenite start and finish temperatures, 35 and 24° C. for the martensite start and finish temperatures, and 88° C. for the Curie temperature (FIG. 16). Magnetization measurements during the thermo-magnetic training yielded a saturation magnetization at room temperature of 73 $Am^2/kg$.

Figure 17:
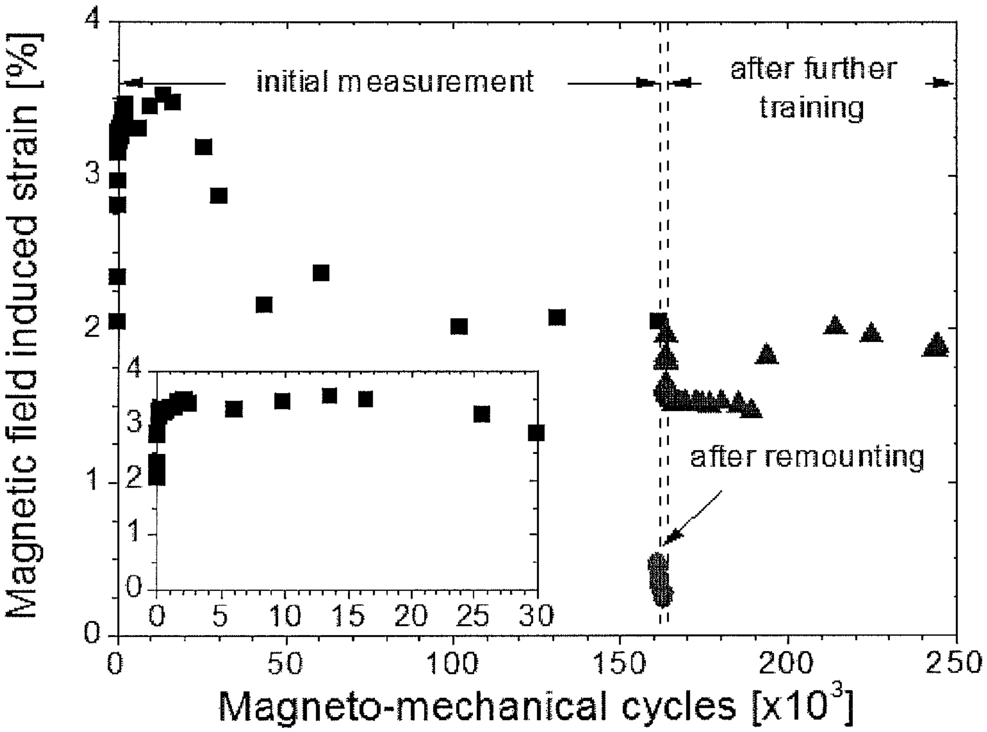
FIG. 17 is a plot of MFIS vs. magneto-mechanical cycles for the first series of tests at room temperature (~16° C.), with insert showing the first 20 cycles. After the initial test up to 161,000 cycles with MFIS of 2.0-3.6%, the foam was unmounted, inspected and remounted. The subsequent MFIS was low, so the foam was subjected to thermo-magnetic training before additional magneto-mechanical testing with MFIS of 1.4-2.1% up to 244,000 cycles.

A first series of magneto-mechanical experiments was performed at ~16° C. under a rotating magnetic field of 0.97 T (FIG. 17). In the martensite phase, the foam exhibited an initial MFIS of 2.1%. This is a factor of twenty larger than values previously obtained for a polycrystalline foam with monomodal, large pores. The MFIS increased over the next 2,000 MMC to ~3.4%, stabilizing at this value up to 15,000 MMC, decreasing steadily to 2.0% up to 75,000 MMC and remaining stable at this value up to 161,000 MMC. The foam was then removed from the sample holder for visual inspection, and remounted after its integrity was confirmed. The subsequent MFIS was below 0.5%, probably because of misoriented twins introduced by handling during demounting and remounting. The foam was magnetically trained (see Methods) to eliminate these misoriented twins. The training was successful, as it re-established a high MFIS value which remained in the range 1.5-1.9% for an additional 90,000 MMC.

Figure 18A:
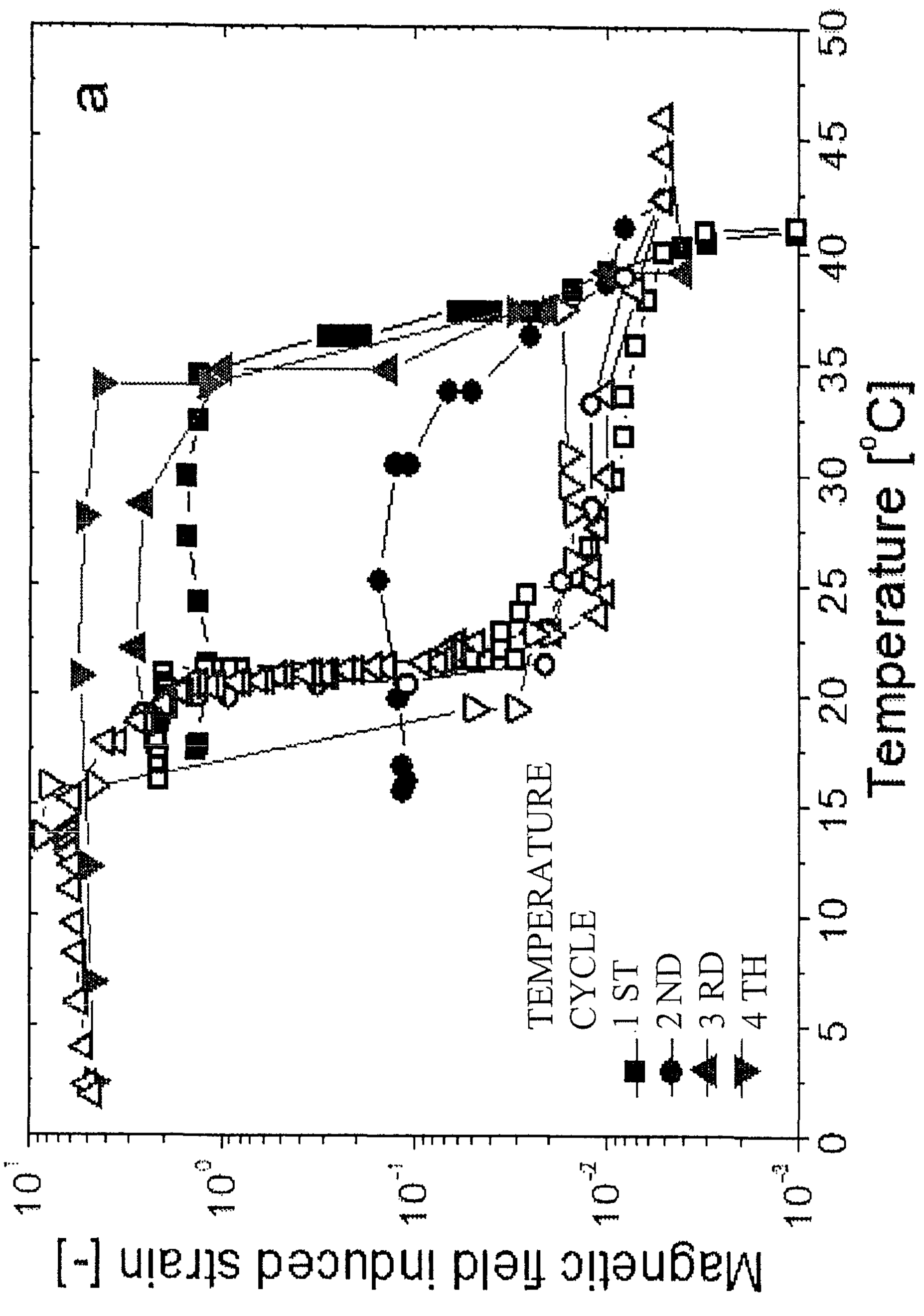
FIG. 18*a-c* portrays MFIS measurement during the second series of tests, when the foam was thermally cycled ten times between its martensite and austenite phases.
Figure 18B:
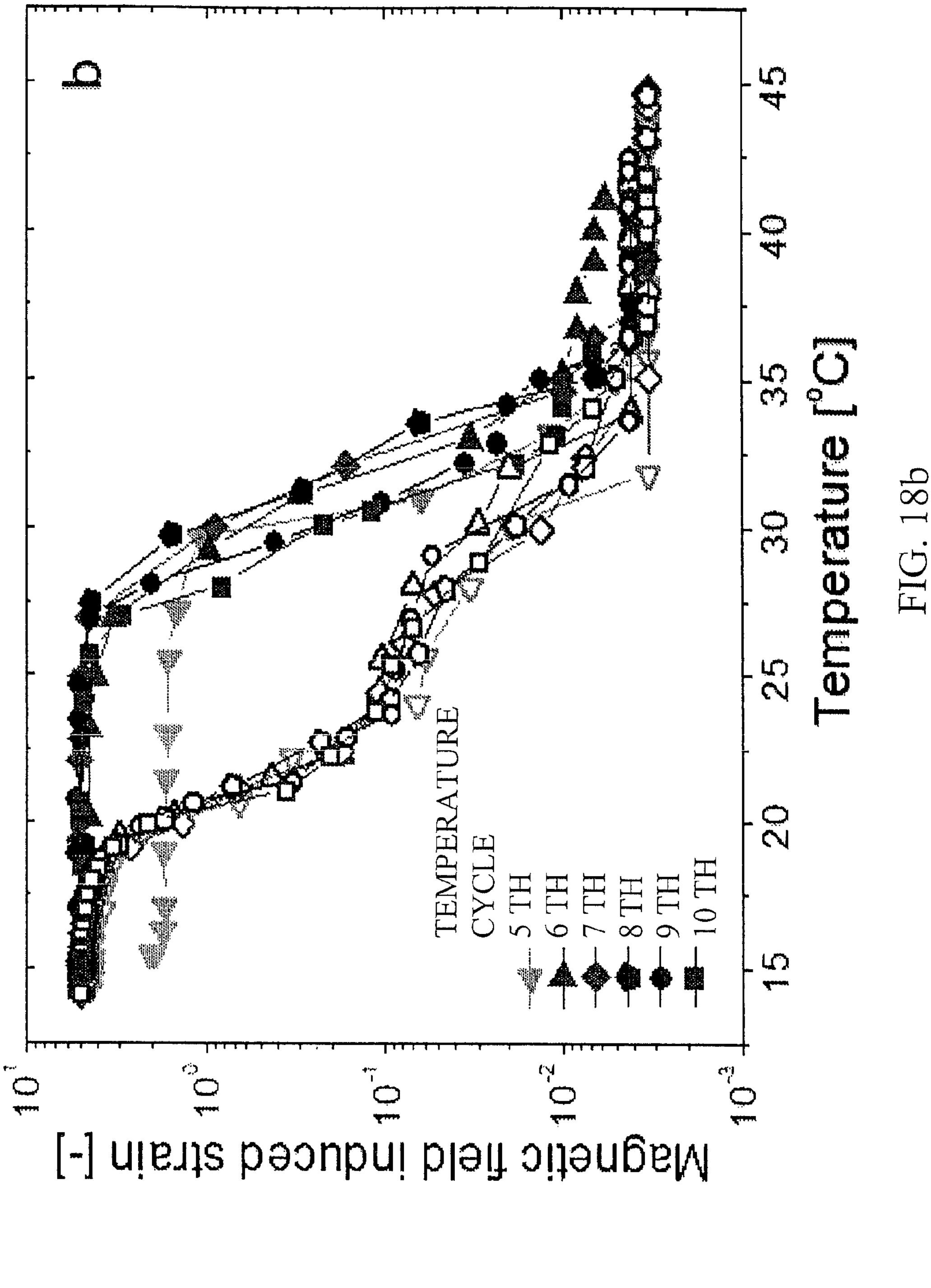
Figure 18C:
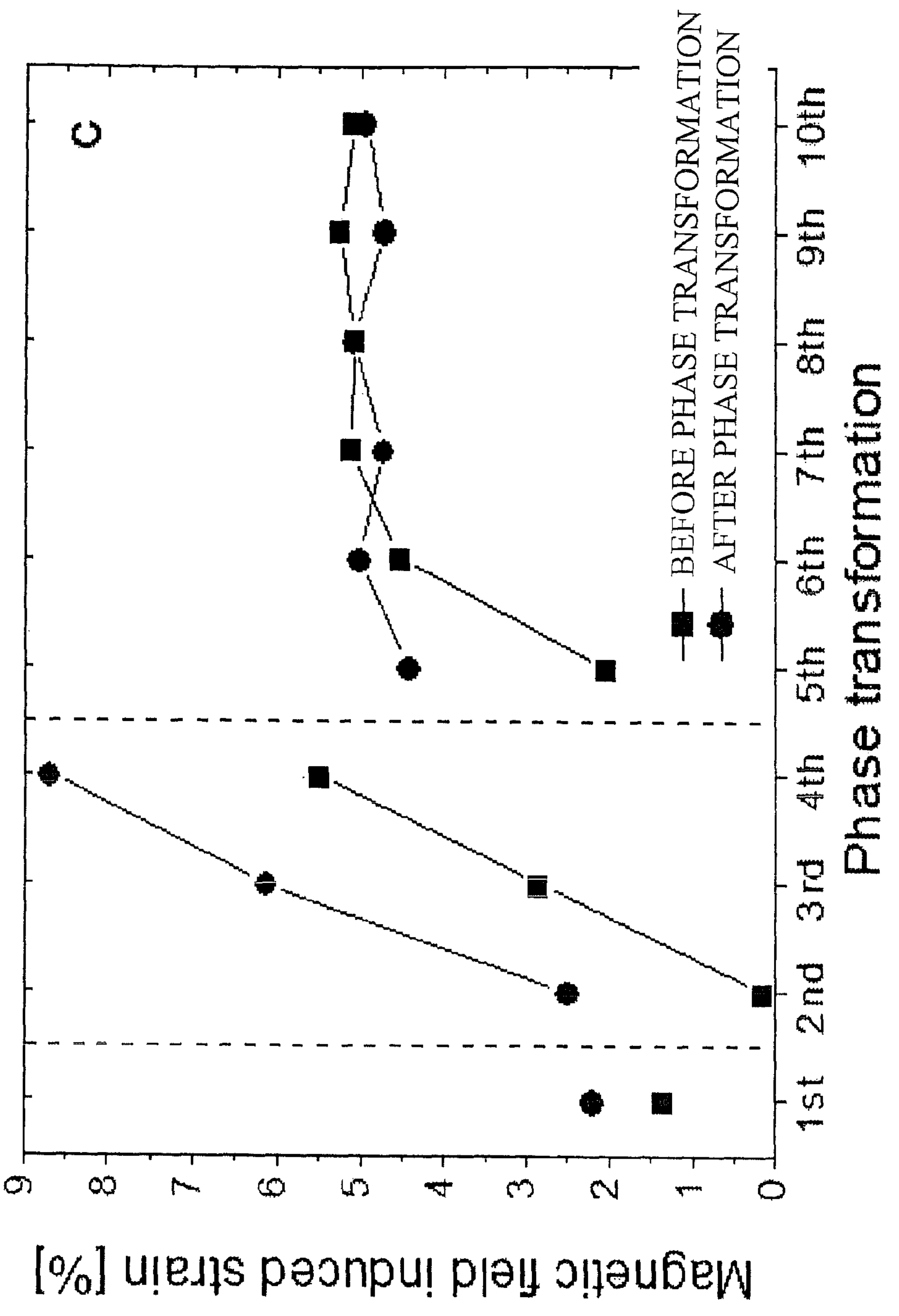

Referring to FIGS. 18*a-c*, a second series of magneto-mechanical experiments, specifically phase transformation and thermo-magneto-mechanical training, was performed while the dual pore foam was thermally cycled between the martensite and austenite states, with the MFIS measured in-situ in the rotating magnetic field with variable temperature. At room temperature, wherein the sample was in the martensite phase, the initial MFIS was 1.4% During the first heating through the phase transformation, the MFIS remains constant at 1.4% in the martensite phase, before dropping rapidly to a near zero value, over a temperature range of 35-41° C. corresponding to the end of the martensite-austenite transformation. The MFIS drop occurred over a finite temperature range, probably because of slight temperature gradients within the foam. On subsequent cooling to room temperature, the MFIS increases sharply between 22 and 23° C., very close to the $M_f$ temperature, to a value of 2.2%, ending up at a larger value than before the heating cycle. At the end of this $1^{st}$ temperature cycle, the temperature was rapidly dropped to below −100° C. At such low temperatures, Ni—Mn—Ga alloys undergo inter-martensitic transitions. As a result, upon heating back to room temperature, the MFIS was strongly reduced to 0.2%. At the end of the second temperature cycle, however, the MFIS recovered its original value of 2.5%. The MFIS further increased in the $3^{rd}$ and $4^{th}$ temperature cycles, reaching an extraordinarily high value of 8.7% at the end of the $4^{th}$ cycle, as shown in FIG. 18*a*. Totally, 10 heating-cooling cycles were performed where the sample was dismounted and remounted from the sample holder between the $4^{th}$ and the $5^{th}$ heating-cooling cycles. Before and after the remount, a clear training effect (i.e. an increase of the MFIS) was observed.

FIG. 19*a* shows the MFIS during thermal cycling, that is, magnitude as a function of the magnetic field orientation for a full field rotation before and after the first and second heating/cooling cycle, and after the third and fourth heating/cooling cycle, of FIGS. 18*a-c*. A detailed view of the MFIS evolution upon heating through the transformation temperature range during the third heating cycle is shown in FIG. 19*b*, with the high MFIS value of 2.6% in the martensite at 29° C. decreasing steadily to near zero in the austenite at 35° C. After the fourth heating/cooling cycle, the foam was unmounted, inspected, and remounted. During the following six temperature cycles, the strain-temperature curves are very reproducible, with a MFIS after cooling of 4.4-5.1% (FIG. 18*b*).

The temperature hysteresis is slightly larger for the first four heating/cooling cycles (~15 K, see FIG. 18*a*) compared to the hysteresis for cycles 6-10 (~10 K, see FIG. 18*b*). Within each set of cycles, the hysteresis is however very consistent. The difference between the two sets is likely due to an experimental artifact of the temperature measurement. The thermocouple was placed loosely in a large pore and was not soldered to the foam to prevent heat effects and mechanical constraint. It is probable that the thermal contact was better in the second set of cycles, thus bringing the hysteresis closer to its true value. Due to the better thermal contact, more details are resolved in the $5^{th}$-$10^{th}$ temperature cycling curves (FIG. 18*b*), such as a shoulder in the strain-temperature cooling curve suggesting that the martensite transformation is discontinuous.

Figure 20:
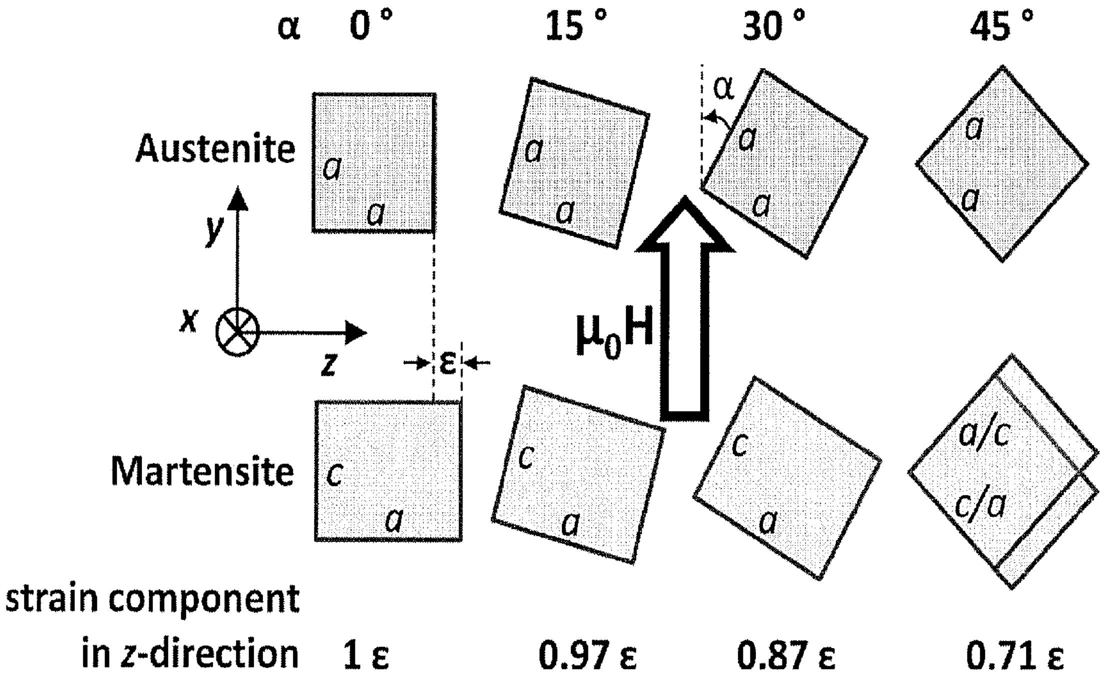
FIG. 20 is a schematic illustrating the variation of MFIS and lattice orientation during phase transformation of individual, unconstrained monocrystalline struts with different orientations with respect to the measurement direction (z). The angle between the crystallographic c direction and the sample z axis is $\alpha$. The angle between the crystallographic c direction and the sample z axis is $\alpha$. The average strains in the z direction from a collection of grains with random orientation is given by the product of the theoretical lattice strain $\epsilon$ and cos ($\alpha$), averaged over all three Euler angles between 0 and $\pi/4$.

For the first four temperature cycles, the strain in the martensite phase just before the phase transformation on heating is significantly smaller than the strain just after the inverse transformation on cooling (FIG. 18*c*). The MFIS also increased from the fifth to the sixth cycle, and then stabilized to a constant value of 4.4-5.1%, on either cooling or heating. These results can be explained by a training effect occurring during the first five thermo-magneto-mechanical cycling experiments. During cooling through the martensite transformation, the twin-microstructure changes dynamically in response to the rotating magnetic field. Twins with an unfavorable orientation (i.e., with their crystallographic c direction strongly misaligned with respect to the magnetic field direction) are steadily eliminated and replaced by twins with their c direction parallel to the direction of the magnetic field. After multiple austenite-martensite cycles, only highly mobile twins are left, which have their crystallographic c direction parallel to the plane in which the magnetic field vector rotates, thus allowing for large MFIS. However, the elimination of poorly aligned twins by thermo-magneto-mechanical training cannot fully explain the extraordinary large MFIS values of 8.7% measured at the end of cycle 4. This is illustrated in FIG. 20, which shows four different alignments of austenite unit cells (top) (representing four grain orientations) and their matching martensite unit cells (bottom) with their c axes aligned to the magnetic field. The strain component in the z direction, which is measured during the present experiments, depends on the misalignment $\alpha$ of the c axis with respect to the z direction of the foam. Assuming random texture, the average strain of each isolated, unconstrained monocrystalline strut is obtained from averaging cos $\alpha$ between 0 and $\pi/4$ over the three Euler angles, which yields 73% of the single crystal theoretical strain, which itself is given as $1-c/a$ (where a and c are the martensite lattice parameters).

Taking the value of $c/a=0.90$ for a 14M martensite, only 7.3% would be possible in a texture-free polycrystalline sample. The largest MFIS of 8.7% measured at the end of cycle 4 may indicate that (i) the foam is textured, because of solidification or (ii) geometrical effects, such as plastic hinging of the struts due to a magnetic-field-induced torque, may be operative. Neutron diffraction experiments are planned in the near future to clarify these aspects.

For bulk Ni—Mn—Ga single crystals, it was shown that ineffectively trained samples can be magneto-mechanically trained in a setting where the sample is constrained. In this in-service training, the single crystal adopts a twin-microstructure compatible with the applied constraints. The inventors' results demonstrate that thermo-magneto-mechanical cycling is an effective in-service training for Ni—Mn—Ga foams that increases the MFIS even with constraints imposed by mounting the sample to a holder. This in-service training is more effective for the foam than for bulk single crystals, a possible explanation being relaxation of external constraints. According to the St. Venant principle, the stress field of a locally-stressed material extends into the material to a distance which compares to the width of the loaded area. For a bulk sample, this stress-affected volume extends to about half the width of the glued (i.e. constrained) face, which is about 1 mm. For foam, the stress-affected zone may be significantly reduced and limited to a few strut diameters, which is in the order of 20 μm.

In summary, the inventors have demonstrated that a polycrystalline Ni—Mn—Ga foam produced by a simple casting process exhibits very high MFIS values of 2.0-3.5%, as measured over 244,000 magneto-mechanical cycles. These values are three orders of magnitude larger than the MFIS of 0.002% exhibited by nonporous, fine-grained Ni—Mn—Ga (and other magnetic shape-memory alloy) and 10-20 times larger than the strain produced by the best magnetostrictive materials, e.g., commercial Terfenol-D with strain of 0.2%. This dramatic improvement is attributed to a mechanical size effect, with the foam node size (~20 μm) being smaller than the grain size, thus allowing the free motion of the twins responsible for the MFIS. Furthermore, the foam MFIS increased, upon thermal cycling between the martensite and austenite phases, to an extraordinarily high value of 8.7%, similar to that of a well-oriented, bulk Ni—Mn—Ga single crystals. A stable value of 4.4-5.1% was reached after a few thermal cycles. These results open the door to the use of inexpensive, cast, polycrystalline Ni—Mn—Ga foams for long-stroke actuators with very rapid response rates and excellent stability over millions of cycles, and for sensors, magnetic cooling systems, and energy harvesting devices.

Relation Between Foam Architecture, Grain Size, and Bamboo Grain Structure

As discussed earlier in this document, the struts formed of multiple grains may be compared to fibers with a bamboo microstructure formed of bamboo sections connected at joints. Grains in which twins span across the entire fiber (the entire strut) exhibit large (local) MFIS. Other grains, for which twin boundaries end at grain boundaries (and not at the surface) don't deform in a magnetic field. Thus, there are grain orientations favoring MFIS and others which disfavor MFIS.

In foam where struts point in different directions, the orientation of the strut also affects the possibility to produce MFIS. Assume that the grain size corresponds to the pore size of the single pore foam or to the size of the large pores of dual pore foam. Then, there will be many grains in the single pore foam for which twins will end at a grain boundary. These twins are blocked. For the dual pore foam, the same twins would be separated from the grain boundaries by pores. Thus, in this case, the twins end at free surfaces and are mobile (as in single crystals).

A similar argument may be developed for foam with larger grains where geometrical constraints may cause multiple twin variants in nodes of large pores/struts. These nodes would act like single crystals with self-accommodated martensite which don't display large MFIS [Chmielus 2008]. The small pore population separates twins of such internally constraint regions and promote twin boundary motion.

Only for foam with very small grain size, i.e. grains with the size of the small pores, twin boundary motion may be suppressed. This is not the case in the present foams. Thus, it is expected that the twins are more mobile in dual pore foam than in single pore foam, as found in the experiments.

Effect of Porosity

Figure 22:
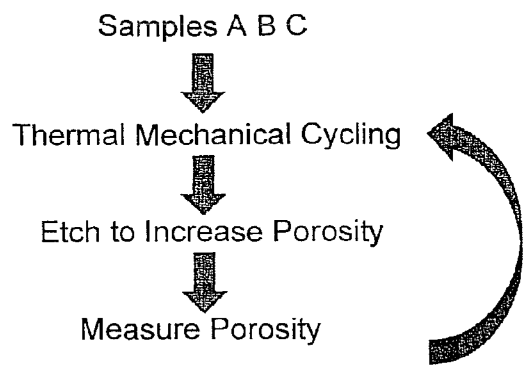
FIG. 22 schematically illustrate procedures for thermo-magneto-mechanical experiments, for studying the dependence of MFIS on porosity, comprising repeated thermal mechanical cycling, etching, and porosity testing.
Figure 23:
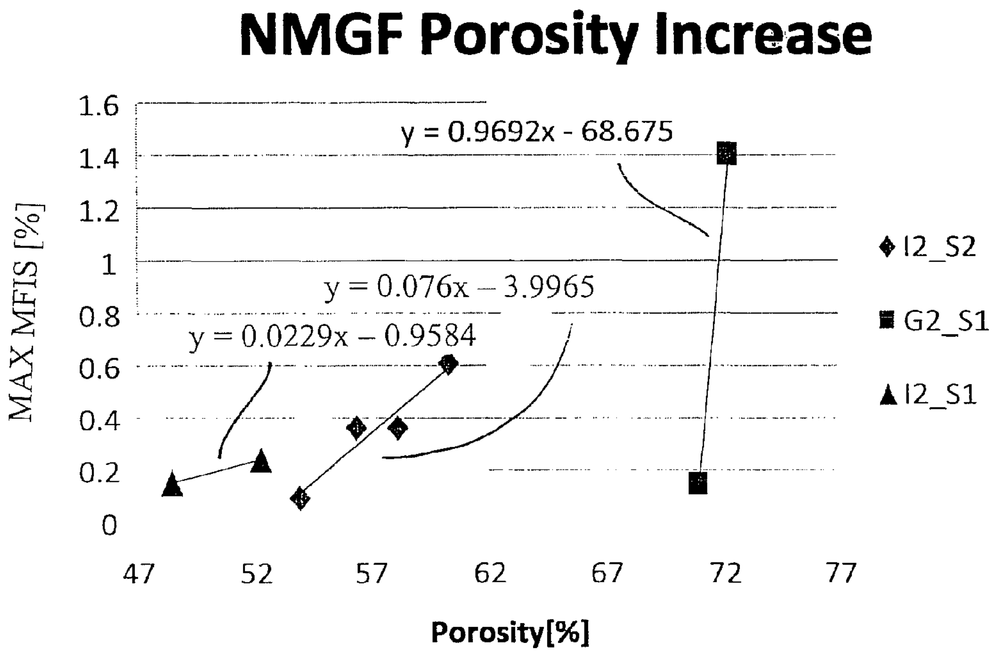
FIG. 23 shows MFIS vs porosity data for three different bimodal pore distribution alloy foam samples.

Repeated thermo-magneto-mechanical experiments vs porosity were conducted on three samples with bimodal pore size distribution, according to procedures schematically portrayed in FIG. 22. It was demonstrated that an increase of porosity leads to an increase of magnetic-field-induced strain (FIG. 23). For all samples, the MFIS increases with increasing porosity. For all samples, the MFIS is larger than for single pore foam.

For samples G2_S1 and I2_S1, there are only two data points to date (FIG. 23). The strong increase of MFIS with a small increase of porosity of sample G2_S1 indicates that there might have been some remaining space-holder in the pores for the first magneto-mechanical test (prior to increasing the porosity). For sample I2_S2, there are four data points which clearly demonstrate a positive correlation between porosity and MFIS.

Effect of Sample Size and Surfaces

Referring to FIGS. 24*a-c*, a dual pore foam sample (K6_S) with original dimensions 2.995×4.062×5.997 mm was tested for MFIS. In its original shape, the sample displayed 0.01% MFIS. Then it was cut in two pieces parallel to the longest edge such that the size of the new pieces (K6_S2 and K6_S2_2A) was 2.995×2×5.997 mm. The MFIS of K6_S2_2A doubled to 0.02%. While K6_S displayed four strain peaks during one revolution of the magnetic field with maxima at 45, 135, 225, and 315°, K6_S2 and K6_S2_2A displaced only two maxima, namely at 135 and 315° for K6_S2 and at 45 and 225° for K6_S2_2A.

These results show that the half of K6_S that later became K6_S2_2A was originally constrained by the other half such that only a fraction of it's MFIS was realized in the first magneto-mechanical experiment. Thus, in polycrystalline materials, internal constraints suppress large MFIS. Surfaces (porosity and 'outer' surfaces) relax internal constraints and enable large MFIS.

Effect of Internal Constraints Via Left-Over Space-Holder

Figure 25A:
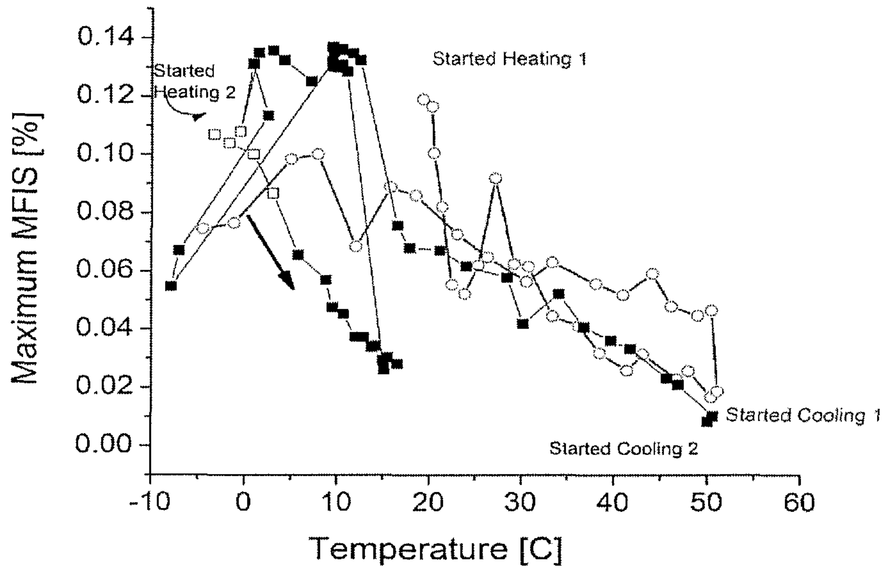
FIGS. 25*a-c* portray MFIS and structural results for heating-cooling cycles performed with a foam at 71% porosity (FIG. 25*a*) and 72.3% porosity (FIG. 25*b*). After cycling (FIG. 25*c*), cracks were found in the struts.
Figure 25B:
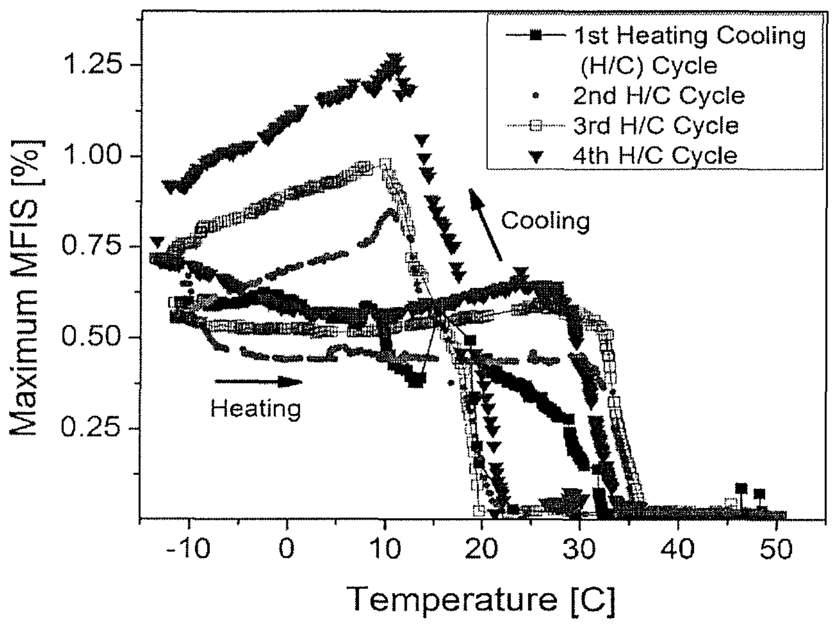
Figure 25C:
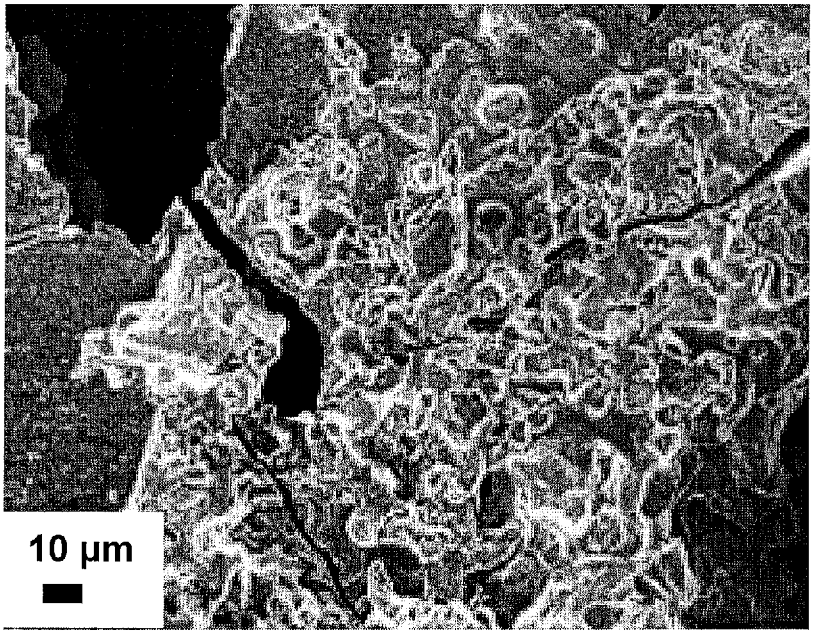

FIGS. 25*a* and *b* portray MFIS results for heating-cooling cycles performed with a foam at 71% porosity (FIG. 25*a*) and 72.3% porosity (FIG. 25*b*). A dual pore foam sample with 71% porosity was tested for MFIS in a rotating magnetic field, which was found to be around 0.1% at room temperature. No systematic training effect was found upon heating and cooling through the phase transformation. After the porosity was slightly increased, the MFIS strongly increased to 0.5% and heating and cooling in the rotating magnetic field resulted in training of the sample with a maximum MFIS of 1.25% after the third heating cycle. Scanning electron micrographs taken after the MFIS experiments revealed cracks in the sample. These results may be rationalized when assuming that with a porosity of 71% there was still some space-holder left in the foam. The space-holder constrained the struts and suppressed macroscopic deformation. Locally, twins were moving and produced considerable deformation. The inhomogeneous, highly localized deformation caused stress concentrations which were relaxed via the formation of cracks. The etching, which increased the porosity to 72.3%, removed the space-holder completely. Individual struts were released and allowed to produce a much larger strain. After cycling (FIG. 25*c*), cracks were found in the struts.

Foam Production and Effect of Foam Architecture on Removal of Space-Holder

The Ni—Mn—Ga foams were created via the casting replication method with sodium aluminate ($NaAlO_2$) as space-holder (chosen because of its high melting temperature of 1650° C., excellent chemical stability with molten metals, and good solubility in acid), in a method similar to that previously used for foams with monosized pores. First, relatively coarse $NaAlO_2$ powders were prepared, as described previously, by cold pressing $NaAlO_2$ powders (technical grade, purchased from Alfa Aesar, Ward Hill, Mass.) at 125 MPa, sintering at 1500° C. for 3 h in air, breaking up the sintered body with mortar and pestle. The resulting powder was sieved into three different size ranges, as shown in FIG. 1: 355-500 μm, used for foams with single pore size, and 75-90 and 500-600 μm used, with a 27:73 volume ratio, for foams with two pore sizes. For the former specimen, the 355-500 μm was directly poured into a 9.7 mm diameter alumina crucible and tapped to a height of 22.1 mm. This was the preform. For the latter specimens, the coarse and fine powders were poured alternatively in small batches into a 9.7 mm diameter alumina crucible filled with acetone (which has no solubility for $NaAlO_2$): the 500-600 μm powder is first poured in a small 45.0 mg batch, followed by a 16.6 mg batch of 75-90 μm powder which is allowed to settled in the space between the 500-600 μm powders from the previous batch. In this manner, the two batches of powders were well mixed, unlike dry mixing which invariably led to powder size segregation. This process was repeated until the $NaAlO_2$ powder preform reached a height of 22.0 mm in the crucible. This latter preform was heated at 70° C. overnight allowing for acetone evaporation, then both preforms were sintered at 1500° C. for 3 h in air to enhance bonds between $NaAlO_2$ powders, thus preventing cracking or particle pushing during infiltration, and creating a percolating $NaAlO_2$ skeleton which can be removed by acid dissolution. The volume fraction of $NaAlO_2$ powders in the preforms containing single and bimodal powder sizes were 43 and 45%, respectively, as calculated from the volume and mass of the preforms.

A $Ni_{51.3}Mn_{25.2}Ga_{23.5}$ (atomic percent) billet, inductively melted from elements with purities 99.9% for Ni, 99.95% for Mn, and 99.999% for Ga (all metal basis, non-metal impurities were not specified), was placed on top of the preform within the alumina crucible, which was then heated to 1200° C. (above the alloy melting temperature of 1125-1130° C.) at a rate of 7° C./min under a vacuum of $3.5\times10^{-6}$ Torr, and maintained for 24 min at 1200° C. to insure melting of the alloy. Then, high purity argon gas was introduced into the furnace to force the molten alloy into the preform at a 1.34 atm pressure, and the temperature was reduced from 1200 to 24° C. at 7° C./min. The infiltrated Ni—Mn—Ga/$NaAlO_2$ composite was cut with a diamond saw into parallelepiped samples with dimensions of x=1.96, y=3.13 and z=6.08 mm for the single powder specimen and x=2.06, y=2.94 and z=6.43 mm for the dual powder specimen. These composite samples were homogenized at 1000° C. for 1 h in high vacuum and then subjected to a stepwise heat-treatment to allow for chemical ordering establishing the $L2_1$ structure [31]: 2 h at 725° C., 10 h at 700° C., and 20 h at 500° C. The annealed composite samples with monosize $NaAlO_2$ powders were then immersed in a 10% HCl aqueous solution to dissolve, under sonication, the $NaAlO_2$ space-holders. After about 53 h of dissolution, a Ni—Mn—Ga foam with 56.6% porosity was achieved. The annealed composite with bimodal $NaAlO_2$ powders was first immersed for about 15 h into a 34% $H_2SO_4$ aqueous solution in a sonication bath to remove the coarse $NaAlO_2$ powders in the foam and then immersed for about 90 h into a 10% HCl aqueous solution to remove the fine $NaAlO_2$ powders and to further thin the struts. This foam achieved a porosity of 66.8%. The water in the sonicator bath was maintained at 24° C. and the acids were replaced every two hours during sonication.

Figure 26:
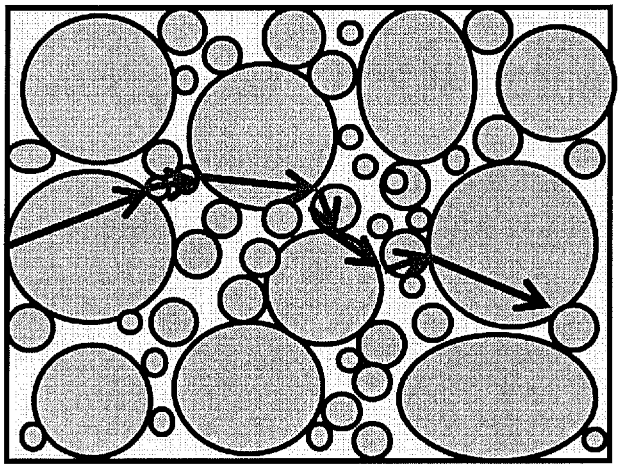
FIG. 26 is a schematic portrayal showing how etching of space-holding of particles in the large size range allows access to particles in the small size range, for access of those small particles for etching, to create both large pores and small pores of an alloy foam.

Thus, it is believed that large space-holder particles can be quickly removed with a selective etchant. The small space-holder particles can then be attacked via the large space-holder with a different etchant. See the schematic portrayal of this approach in FIG. 26, illustrating stepwise removal of large particles providing access to the small particles for removal of said small particles.

Further Description of Methods

The Ni—Mn—Ga foam was created by the replication method, discussed above, using liquid metal infiltration of a preform of ceramic space-holder powders. Here a 73:27 (by weight) blend of large (500-600 μm) and small (75-90 μm) sodium aluminate powders was used, unlike large-pore embodiments where only large powders were used.

The blended powders were poured into an alumina crucible layer with 9.7 mm diameter and lightly sintered in air at 1500° C. for 3 h to create necks between powders. After cooling, two ingots of equal mass, with atomic compositions of $Ni_{52.0}Mn_{24.4}Ga_{23.6}$ and $Ni_{52.3}Mn_{23.9}Ga_{23.8}$, were placed on top of the sintered preform which was then heated to 1200° C. at 7° C./min under a vacuum of $3.5\times10^{-6}$ tor. High purity argon gas was introduced in the furnace at a pressure of 1.34 atm to push the molten alloy into the preform, and the temperature was then dropped to room temperature at 7° C./min. The resulting Ni—Mn—Ga/sodium aluminate composite was cut with a diamond saw to create a parallelepiped sample with approximate dimensions of x=2.3, y=3.0 and z=6.2 mm. Most of the sodium aluminate space holder was removed by immersion in 34% $H_2SO_4$ under ultrasonication. Immersion in 10% HCl removed the remaining sodium aluminate and thinned the foam struts, resulting in a porosity of 62%, as determined from measurements of mass and volume. The foam was homogenized at 1000° C. for 1 h in vacuum and then subjected to a stepwise chemical ordering heat-treatment (2 h at 725° C., 10 h at 700° C., and 20 h at 500° C.) to establish the $L2_1$ structure. The magnetic and thermal properties were measured using a Digital Measurement Systems (DMS) Model 10 vibrating sample magnetometer (VSM) with an applied magnetic field of 0.028 T parallel to the z direction: the foam was heated at 8.5 K/min to 150° C., the temperature was held for 2 min and then reduced at 8.5 K/min to room temperature, where it was held for 5 min.

Figure 21:
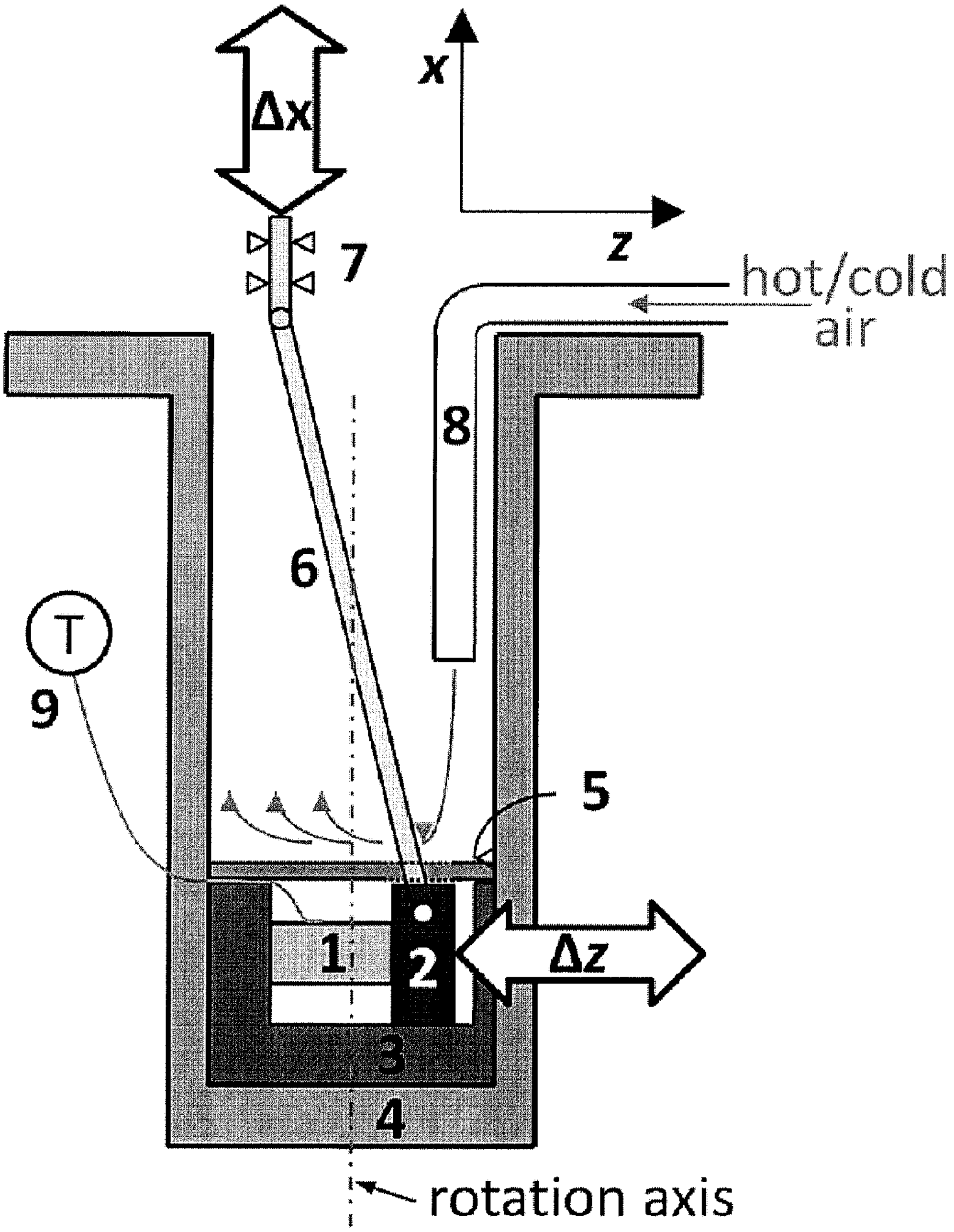
FIG. 21 is a schematic of the magneto-mechanical experiment. The foam (1) is glued to the sliding head (2) and holder (3). The sample holder is bolted to a tube (4), which is placed in the rotating field (field axis shown). A lid (5) is enclosing the foam. With the ceramic pushing rod (6) and a redirection mechanism (7), the displacement of the foam in its z direction is transformed to motion in the x direction which is measured outside the magnetic field with a Heidenhain extensometers type MT1281. A tube (8) is used to direct heated and cooled air onto the lid. The thermocouple (9) measures the temperature on the foam surface. The dash-dotted line marks the rotation axis of the magnetic field. The magnetic field vector is oriented perpendicular to the rotation axis.

In a first series of magneto-mechanical experiments near ambient temperature (~16° C.), the foam was exposed to a rotating magnetic field $\mu_0H=0.97$ T while being glued at one end to a sample holder and at the other to a head capable of sliding in the direction of the foam z axis only (FIG. 21). The magnetic field rotational axis was parallel to the foam x axis (FIG. 21) with the magnetic field vector rotating within the y-z plane. While the steady-state rotation frequency of the magnetic field was 4,000 revolutions per minute (rpm) for magneto-mechanical cycling, it was reduced to 30 rpm during strain data acquisition to reduce noise. The foam minimum and maximum lengths were measured along the z axis (see FIG. 19*b*) and transformed to MFIS values using the engineering definition of strain (ratio of maximum sample displacement to minimal sample length z). At first, the foam was subjected to 80,000 field rotations, corresponding to 160,000 MMC (during one full rotation of the magnetic field, the foam contracts and expands twice, FIG. 19*b*). The foam was then unmounted, inspected, remounted, and magneto-mechanically tested for an additional 2,000 MMC. The test was interrupted early because of low MFIS values. The foam was unmounted, thermo-magnetically trained by exposing it in the VSM to a magnetic field $\mu_0H=2$ T parallel to the z direction while heating to, and then cooling from, 150° C. with nitrogen at a rate of 8.5 K/min, and remounted to the sample holder. Magneto-mechanical tests were then resumed under the same conditions as above for another 81,000 MMC.

A second series of magneto-mechanical experiments was performed in the same apparatus while temperature was cycled (as summarized in Table 2) between ~15 and ~40° C., encompassing the range of phase transformations.

TABLE 2

Parameters of thermal cycle experiments.

| Thermal cycle Number | Initial temperature [° C.] | Initial strain [%] | Time to heat [s] | Highest temperature [° C.] | Time to cool [s] | Final temperature [° C.] | Final strain [%] |
|---|---|---|---|---|---|---|---|
| 1 | 18 | 1.4 | 380 | 41 | 980 | 18* | 2.2 |
| 2 | 16 | 0.2 | 550 | 42 | 460 | 19 | 2.5 |
| 3 | 19 | 2.9 | 260 | 46 | 2100 | 2 | 6.1 |
| 4 | 2 | 5.5 | 320 | 37 | 400 | 14 | 8.7 |
| 5 | 16 | 2.0 | 600 | 45 | 540 | 14 | 4.4 |
| 6 | 14 | 4.5 | 400 | 42 | 690 | 14 | 5.0 |
| 7 | 14 | 5.1 | 400 | 45 | 1080 | 15 | 4.7 |
| 8 | 15 | 5.1 | 420 | 45 | 660 | 14 | 5.1 |
| 9 | 14 | 5.3 | 630 | 43 | 750 | 15 | 4.7 |
| 10 | 15 | 5.1 | 570 | 42 | 850 | 14 | 4.9 |

*After reaching 18° C. on cooling in the first cycle, the temperature dropped to about −100° C.

At the end of the 1st cycle only, the temperature was rapidly dropped to below −100° C. A thermocouple (marked (9) on FIG. 20) was attached loosely to a pore at the top surface of the foam. Hot (for heating) and cold (for cooling) air was directed towards the sample chamber through a tube (5). Due to the presence of a lid (8), the foam was protected from the direct air flow. Conduction through the sample holder and sliding head, as well as natural convection from the surrounding air were heating the foam indirectly and therefore smoothly. During the ten temperature cycles, the magnetic field was rotated at 30 rpm allowing precise MFIS measurements. The experiment was interrupted twice (before the 2nd and the 5th cycles): the foam was then removed from the sample holder, inspected for damage and remounted.

REFERENCES

1. Ullakko, K., Huang, J. K., Kantner, C., O'Handley, R. C., & Kokorin, V. V., Large magnetic-field-induced strains in Ni2MnGa single crystals, *Appl. Phys. Lett.* 69, 1966-1968 (1996).
2. James, R. D. & Wuttig, M., Magnetostriction of martensite, *Phil. Mag. A* 77, 1273-1299 (1998).
3. Murray, S. J., et al. Large field induced strain in single crystalline Ni—Mn—Ga ferromagnetic shape memory alloy. *J. Appl. Phys.* 87, 5774-5776 (2000)
4. Müllner, P., Chernenko, V. A., Wollgarten, M., & Kostorz, G., Large cyclic deformation of a Ni—Mn—Ga shape memory alloy induced by magnetic fields. *J. Appl. Phys.* 92, 6708-6713 (2002)
5. Suorsa, I., Tellinen, J., Ullakko, K., & Pagounis, E., Voltage generation induced by mechanical straining in magnetic shape memory materials. *J. Appl. Phys.* 95, 8054-8058 (2004).
6. Sarawate, N. & Dapino, M., Experimental characterization of the sensor effect in ferromagnetic shape memory Ni—Mn—Ga. *Appl. Phys. Lett.* 88, 121923 (2006).

7. Karaman, I., Basaran, B., Karaca, H. E., Karsilayan, A. I., & Chumlyakov, Y. I, Energy harvesting using martensite variant reorientation mechanism in a NiMnGa magnetic shape memory alloy. *Appl. Phys. Lett.* 90, 172505 (2007).
8. Gaitzsch, U., Roth, S., Rellinghaus, B. & Schultz, L. Adjusting the crystal structure of NiMnGa shape memory ferromagnets. *J. Magn. Magn. Mater.* 305, 275-277 (2006)
9. Gaitzsch, U., PŘtschke, M., Roth, S., Rellinghaus, B. & Schultz, L. Mechanical training of polycrystalline 7M $Ni_{50}Mn_{30}Ga_{20}$ magnetic shape memory alloy. *Scr. Mater.* 57, 493-495 (2007)
10. PŘtschke, M., Gaitzsch, U., Roth, S., Rellinghaus, B. & Schultz, L. Preparation of melt textured Ni—Mn—Ga. *J. Magn. Magn. Mater.* 316, 383-385 (2007)
11. Boonyongmaneerat, Y., Chmielus, M., Dunand, D. C. & Müllner, P. Increasing Magnetoplasticity in Polycrystalline Ni—Mn—Ga by Reducing Internal Constraints through Porosity. *Phys. Rev. Lett.* 99, 247201 (2007)
12. Müllner, P., Chernenko, V. A. & Kostorz, G. Large cyclic magnetic-field-induced deformation in orthorhombic (14M) Ni—Mn—Ga martensite. *J. App. Phys.* 95, 1531-1536 (2004).
13. Sozinov, A., Likhachev, A. A., Lanska, N. & Ullakko, K., Giant magnetic-field-induced strain in NiMnGa seven-layered martensitic phase. *Appl. Phys. Lett.* 80, 1746-1746 (2002).
14. Chmielus, M., Chernenko, V. A., Knowlton, W. B., Kostorz, G. & Müllner, P. Training, constraints, and high-cycle magneto-mechanical properties of Ni—Mn—Ga magnetic shape-memory alloys. *Eur. Phys. J. Special Topics* 158, 79-85 (2008)
15. Marioni, M. A., O'Handley, R. C., & Allen, S. M. Pulsed magnetic field-induced actuation of Ni—Mn—Ga single crystals. *Appl. Phys. Lett.* 83, 3966-3968 (2003)
16. Lázpita, P., Rojo, G., GutiHrrez, J., Barandiaran, J. M. & O'Handley, R. C. Correlation between magnetization and deformation in a NiMnGa shape memory alloy polycrystalline ribbon. Sensor Lett. 5, 65-68 (2007)
17. Gaitzsch, U., PŘtschke, M., Roth, S., Rellinghaus, B. & Schultz, L. A 1% magnetostrain in polyscrystalline 5M Ni—Mn—Ga. *Acta Mater.* 57, 365-370 (2009)
18. Gaitzsch, U., Techapiensancharoenkij, R., PŘtschke, M., Roth, S., & Schultz, L. Acoustic assisted magnetic field induced strain in 5M Ni—Mn—Ga polyscrystals. *IEEE Trans. Magn.* 45, 1919-1921 (2009).
19. Gschneidner, Jr. K. A., & Pecharsky, V. K., Recent developments in magnetocaloric materials, *Rep. Progr. Phys.* 68, 1479-1539 (2005).
20. Segui, C., Chernenko, V. A., Pons, J., Cesari, E., Khovailo V., & Takagi T., Low temperature-induced intermartensitic phase transformations in Ni—Mn—Ga single crystals, *Acta Mater.* 53, 111-120 (2005).
21. Hathaway, K. & Clark, A. E. Magnetostrictive Materials. *MRS Bull.* 18, 34-41 (1993).
22. Conde, Y., Despois, J F, Goodall, R., et al. Adv Eng Mater 2006; 8(9): 795
23. Boonyongmaneerat and Dunand. Adv Eng Mater 2008; 10(4):379

Although this invention has been described above with reference to particular means, materials and embodiments, it is to be understood that the invention is not limited to these disclosed particulars, but extends instead to all equivalents within the broad scope of the following claims.

We claim:

1. A foam alloy material comprising:

a polycrystalline porous structure of magnetoplastic or magnetoelastic material;

said porous structure comprising struts of said magnetoplastic or magnetoelastic material connected at nodes of said magnetoplastic or magnetoelastic material, so that said porous structure comprises pores between said struts;

wherein at least a portion of said struts comprise twin boundaries that extend transversely across an entire strut.

2. A foam alloy material comprising:

a polycrystalline porous structure of magnetoplastic or magnetoelastic material;

said porous structure comprising struts of said magnetoplastic or magnetoelastic material connected at nodes of said magnetoplastic or magnetoelastic material, so that said porous structure comprises pores between said struts;

wherein at least a portion of said struts comprise twin boundaries that extend transversely across an entire strut, wherein said struts are comprised of grains of said magnetoplastic or magnetoelastic material and said pores are sized to be generally the size of said grains.

3. A foam alloy material as in claim 2, wherein said the foam alloy material further comprising small pores inside said nodes.

4. A foam alloy material as in claim 3, wherein said small pores are smaller than said grains.

5. A foam alloy material as in claim 3, wherein said small pores are an order of magnitude smaller than said pores between the struts.

6. A foam alloy material as in claim 3, wherein said small pores are 0.05-0.25 times the size of the pores between the struts.

7. A foam alloy material of claim 1 including alloys comprising nickel, manganese, and gallium.

8. A foam alloy material claim 1 including alloys comprising iron and platinum.

9. A foam alloy material claim 1 including alloys comprising iron and palladium.

10. A foam alloy material of claim 1 including alloys comprising nickel, cobalt, and gallium.

11. A foam alloy material of claim 7 which comprises at least 10 atomic percent each of nickel, manganese, and gallium.

12. A magnetic material comprising:

a polycrystalline porous structure of the solid magnetic material;

said porous structure comprising polycrystalline struts connected at nodes;

at least some of said polycrystalline struts including grain boundaries that extend transversely across an entire strut;

wherein said porous structure comprises pores between said struts and in said nodes, said pores being of at least two ranges of pore size comprising a first pore-size-range, and a second, smaller pore-size-range.

13. A material as in claim 12, wherein said struts are comprised of grains of magnetoplastic or magnetoelastic material and said pores of said first pore-size-range are generally the size of said grains.

14. A material as in claim 12, wherein said pores of said second pore-size-range are inside said nodes.

15. A material as in claim 14, wherein said struts are comprised of grains of magnetoplastic or magnetoelastic material and said pores of said second pore-size-range are smaller than said grains.

16. A material as in claim 12, wherein said second pore-size-range is an order of magnitude smaller than said first pore-size-range.

17. A material as in claim 12, wherein said second pore-size-range is 0.05-0.25 times said first pore-size-range.

18. A material as in claim 12, wherein said first pore-size-range is 500-600 μm and said second pore-size-range is 75-90 μm.

19. The material of claim 12 including alloys comprising nickel, manganese, and gallium.

20. The material of claim 12 including alloys comprising iron and platinum.

21. The material of claim 12 including alloys comprising iron and palladium.

22. The material of claim 12 including alloys comprising nickel, cobalt, and gallium.

23. The material of claim 12 which comprises at least 10 atomic percent each of nickel, manganese, and gallium.

* * * * *